(12) United States Patent
Sarda et al.

(10) Patent No.: US 11,922,516 B2
(45) Date of Patent: Mar. 5, 2024

(54) DYNAMIC PATTERN RECOGNITION ANALYSIS IN REAL-TIME DURING CONTINUING DATA EXTRACTION

(71) Applicant: Synchrony Bank, Stamford, CT (US)

(72) Inventors: Piyush Sarda, Stamford, CT (US); Shishir Bhatia, Stamford, CT (US); Venkata Sai Sowmya Pottimurthy, Stamford, CT (US); Adbul Abdulrahman, Stamford, CT (US); Ajaywant Rana, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 18/315,751

(22) Filed: May 11, 2023

(65) Prior Publication Data
US 2023/0368306 A1    Nov. 16, 2023

Related U.S. Application Data

(60) Provisional application No. 63/341,297, filed on May 12, 2022.

(51) Int. Cl.
*G06Q 40/12* (2023.01)

(52) U.S. Cl.
CPC .................. *G06Q 40/12* (2013.12)

(58) Field of Classification Search
CPC ...................................... G06Q 40/12
See application file for complete search history.

(56) References Cited

U.S. PATENT DOCUMENTS 9,786,015 B1 * 10/2017 Roumeliotis .......... G06Q 40/12

* cited by examiner

*Primary Examiner* — Paul Danneman
(74) *Attorney, Agent, or Firm* — Polsinelli LLP

(57) ABSTRACT

A data management system identifies data stores that store transaction datasets associated with transactions. The data stores are configured based on respective parameters, and continue to receive additional transaction data over time. The system generates scripts based on the data stores' parameters and based on a filtering scheme. The system uses the scripts to extract subsets of the transaction datasets according to the filtering scheme in real-time as the data stores continue to receive additional transaction data. The system merges the extracted subsets of the transaction datasets into an output dataset according to an output scheme, and analyzes the output dataset, all in real-time as the data stores continue to receive the additional transaction data and the system continues to merge the extracted subsets. By analyzing the output dataset, the system recognizes a pattern in the output dataset. The system outputs an alert indicative of the recognized pattern.

57 Claims, 11 Drawing Sheets

FIG. 3A

User Interface 305A

- Dataset Name 310: Data1
- Process 315: AUTH
- Num. of Obs. 320: 10000
- Engine Name 325: AFDYC01
- RUN

- Date From 330: 01 Aug 2021
- Date To 335: 10 Aug 2021
- Client No. 340: 101256
- Sys. Num. 345:
- Prin Num. 350:

- Days Since Open ≥ 355:
- Auth. Strategy Num. 360:
- Fraud Strategy Num. 365:
- Dynamic Eng. Num. 370:
- Static Eng. Num. 375:
- Final Decision 380:
- CBR Score ≥ 385:
- Behavior Score ≥ 390:
- MOB ≥ 395:

FIG. 3B

User Interface 305B

- Dataset Name 310: Data2
- Process 315: AUTH
- Num. of Obs. 320: 10000
- Engine Name 325: AFDYCGAS
- RUN

- Date From 330: 02 Jul 2021
- Date To 335: 20 Jul 2021
- Client No. 340: 695681
- Sys. Num. 345:
- Prin Num. 350:

- Days Since Open ≥ 355:
- Auth. Strategy Num. 360:
- Fraud Strategy Num. 365:
- Dynamic Eng. Num. 370:
- Static Eng. Num. 375:
- Final Decision 380:
- CBR Score ≥ 385:
- Behavior Score ≥ 390:
- MOB ≥ 395:

DYNAMIC PATTERN RECOGNITION ANALYSIS IN REAL-TIME DURING CONTINUING DATA EXTRACTION

CROSS-REFERENCE TO RELATED APPLICATIONS

The present invention claims the priority benefit of U.S. provisional patent application No. 63/341,297 filed May 12, 2022 and titled "Dynamic Pattern Recognition Analysis in Real-time During Continuing Data Extraction," the disclosure of which is incorporated by reference herein.

BACKGROUND

Field of the Invention

The present invention generally pertains to extraction and merging of data from different data stores using scripts generated to be customized to the parameters of each data store, pattern recognition analyses run on the merged data in real-time as the data continues to be extracted and merged, and alert systems for alerting users in real-time regarding detected patterns in the data.

Description of the Related Art

Massive volumes of transactions are processed every day worldwide. These transactions include, for example, credit card transactions, debit card transactions, cash transactions, loan transactions, transactions involving lines of credit, and the like. Generally, information about each of these transactions is received and stored in various data stores. Many of these data stores are of different types compared to one another, such as databases, data lake systems, statistical analysis software (SAS), software as a service (SaaS) services, and the like. Many of these data stores store this transaction according to very different formats, organizational schemes, and the like. These factors, along with the fact that more transaction information continues to flood in at a rapid rate as any attempts to manipulate this transaction information are made, makes it very difficult to compile disparate transaction information from different data stores or to make any analyses of transaction information across the different data stores, without the transaction information being significantly out-of-date by the time the transaction information is compiled and any analysis is performed.

SUMMARY

Systems and methods for dynamic extraction and analysis of data are described. A data management system identifies data stores that store transaction datasets associated with transactions. The data stores are configured based on respective parameters, and continue to receive additional transaction data over time. The system generates scripts based on the data stores' parameters and based on a filtering scheme. The system uses the scripts to extract subsets of the transaction datasets according to the filtering scheme in real-time as the data stores continue to receive additional transaction data. The system merges the extracted subsets of the transaction datasets into an output dataset according to an output scheme, and analyzes the output dataset, all in real-time as the data stores continue to receive the additional transaction data and the system continues to merge the extracted subsets. By analyzing the output dataset, the system recognizes a pattern in the output dataset. The system outputs an alert indicative of the recognized pattern.

In one example, an apparatus for dynamic extraction and analysis of data is provided. The apparatus includes a memory and one or more processors (e.g., implemented in circuitry) coupled to the memory. The one or more processors are configured to and can: identify a plurality of data stores that store a plurality of transaction datasets associated with a plurality of transactions, wherein the plurality of data stores continue to receive additional transaction data associated with additional transactions over time, wherein the plurality of data stores are configured based on respective parameters; identify a filtering scheme; dynamically generate a plurality of scripts based on the respective parameters corresponding to the plurality of data stores and based on the filtering scheme; periodically extract subsets of the plurality of transaction datasets according to the filtering scheme in real-time as the plurality of data stores continue to receive the additional transaction data; identify an output scheme; periodically merge the extracted subsets of the plurality of transaction datasets into an output dataset according to the output scheme in real-time as the subsets of the plurality of transaction datasets continue to be extracted; periodically analyze the output dataset in real-time as the extracted subsets continue to be merged, wherein analyzing the output dataset results in recognizing a pattern in the output dataset; and output an alert indicative of the recognized pattern.

In another example, a method of dynamic extraction and analysis of data is provided. The method includes: identifying a plurality of data stores that store a plurality of transaction datasets associated with a plurality of transactions, wherein the plurality of data stores continue to receive additional transaction data associated with additional transactions over time, wherein the plurality of data stores are configured based on respective parameters; identifying a filtering scheme; dynamically generating a plurality of scripts based on the respective parameters corresponding to the plurality of data stores and based on the filtering scheme; periodically extracting subsets of the plurality of transaction datasets according to the filtering scheme in real-time as the plurality of data stores continue to receive the additional transaction data; identifying an output scheme; periodically merging the extracted subsets of the plurality of transaction datasets into an output dataset according to the output scheme in real-time as the subsets of the plurality of transaction datasets continue to be extracted; periodically analyzing the output dataset in real-time as the extracted subsets continue to be merged, wherein analyzing the output dataset results in recognizing a pattern in the output dataset; and outputting an alert indicative of the recognized pattern.

In another example, a non-transitory computer-readable medium is provided that has stored thereon instructions that, when executed by one or more processors, cause the one or more processors to: identify a plurality of data stores that store a plurality of transaction datasets associated with a plurality of transactions, wherein the plurality of data stores continue to receive additional transaction data associated with additional transactions over time, wherein the plurality of data stores are configured based on respective parameters; identify a filtering scheme; dynamically generate a plurality of scripts based on the respective parameters corresponding to the plurality of data stores and based on the filtering scheme; periodically extract subsets of the plurality of transaction datasets according to the filtering scheme in real-time as the plurality of data stores continue to receive the additional transaction data; identify an output scheme; periodically merge the extracted subsets of the plurality of transaction datasets into an output dataset according to the output scheme in real-time as the subsets of the plurality of transaction datasets continue to be extracted; periodically analyze the output dataset in real-time as the extracted subsets continue to be merged, wherein analyzing the output dataset results in recognizing a pattern in the output dataset; and output an alert indicative of the recognized pattern.

In another example, an apparatus for dynamic extraction and analysis of data is provided. The apparatus includes: means for identifying a plurality of data stores that store a plurality of transaction datasets associated with a plurality of transactions, wherein the plurality of data stores continue to receive additional transaction data associated with additional transactions over time, wherein the plurality of data stores are configured based on respective parameters; means for identifying a filtering scheme; means for dynamically generating a plurality of scripts based on the respective parameters corresponding to the plurality of data stores and based on the filtering scheme; means for periodically extracting subsets of the plurality of transaction datasets according to the filtering scheme in real-time as the plurality of data stores continue to receive the additional transaction data; means for identifying an output scheme; means for periodically merging the extracted subsets of the plurality of transaction datasets into an output dataset according to the output scheme in real-time as the subsets of the plurality of transaction datasets continue to be extracted; means for periodically analyzing the output dataset in real-time as the extracted subsets continue to be merged, wherein analyzing the output dataset results in recognizing a pattern in the output dataset; and means for outputting an alert indicative of the recognized pattern.

In some aspects, the apparatus includes a mobile device, a mobile telephone, a smart phone, a mobile handset, a wireless communication device, a personal computer, a laptop computer, a server computer, or another computing device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 3A is a conceptual diagram illustrating a user interface indicating a first filtering scheme for a data extraction engine of a special-purpose analysis system, in accordance with some examples;

FIG. 3B is a conceptual diagram illustrating a user interface indicating a second filtering scheme for the data extraction engine of the special-purpose analysis system, in accordance with some examples;

DETAILED DESCRIPTION

Figure 1:
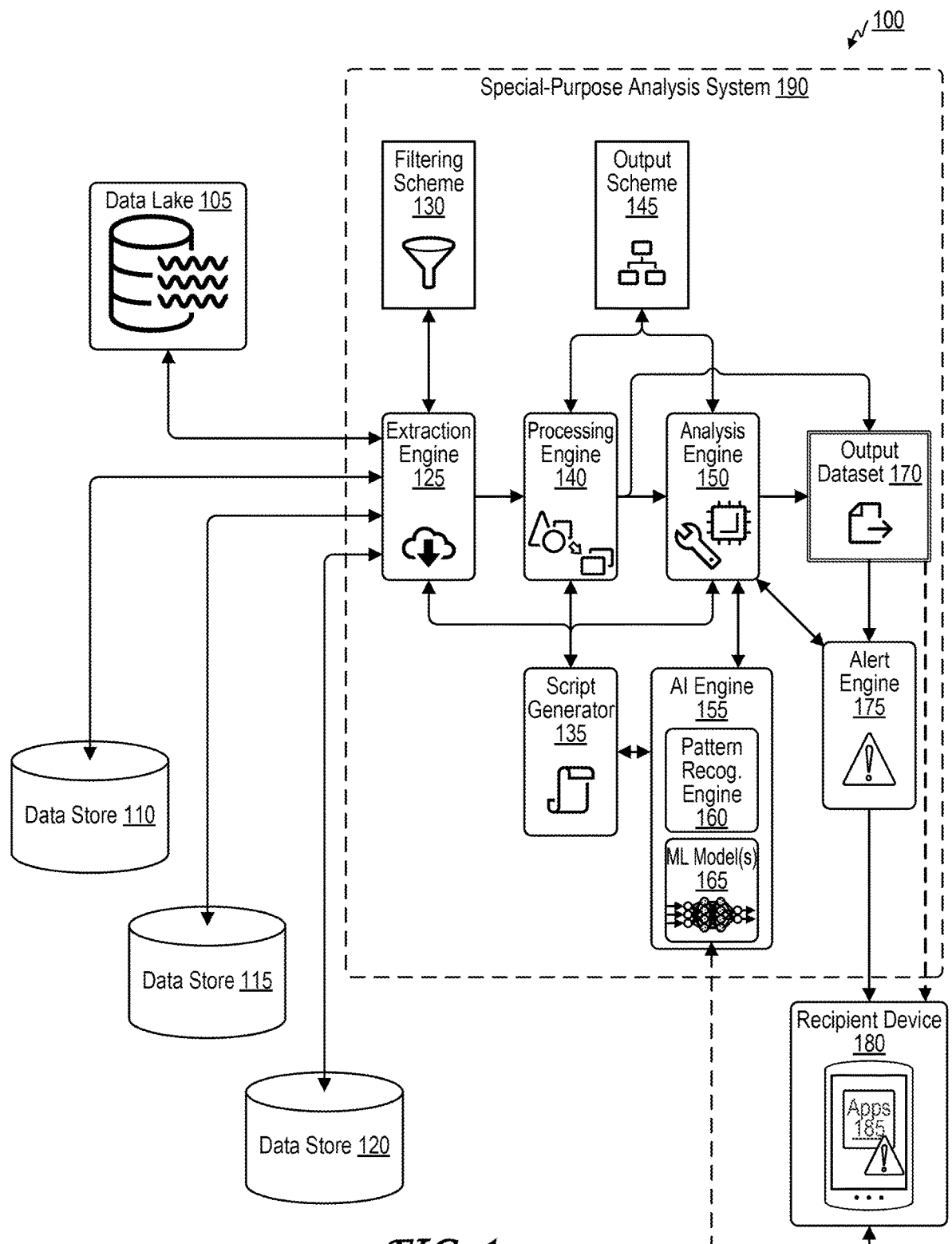
FIG. 1 is a block diagram illustrating a system architecture for a special-purpose analysis system, in accordance with some examples.

Massive volumes of transactions are processed every day worldwide. These transactions include, for example, credit card transactions, debit card transactions, cash transactions, loan transactions, transactions involving lines of credit, and the like. Generally, information about each of these transactions is received and stored in various data stores. Many of these data stores are of different types compared to one another, such as databases, data lake systems, statistical analysis software (SAS), software as a service (SaaS) services, and the like. Many of these data stores store this transaction according to very different formats, organizational schemes, and the like. These factors, along with the fact that more transaction information continues to flood in at a rapid rate as any attempts to manipulate this transaction information are made, makes it very difficult to compile disparate transaction information from different data stores or to make any analyses of transaction information across the different data stores, without the transaction information being significantly out-of-date by the time the transaction information is compiled and any analysis is performed.

Systems and methods for dynamic extraction and analysis of data are described. A data management system identifies data stores that store transaction datasets associated with transactions. The data stores are configured based on respective parameters, and continue to receive additional transaction data over time. The system generates scripts based on the data stores' parameters and based on a filtering scheme. The system uses the scripts to extract subsets of the transaction datasets according to the filtering scheme in real-time as the data stores continue to receive additional transaction data. The system merges the extracted subsets of the transaction datasets into an output dataset according to an output scheme, and analyzes the output dataset, all in real-time as the data stores continue to receive the additional transaction data and the system continues to merge the extracted subsets. By analyzing the output dataset, the system recognizes a pattern in the output dataset. The system outputs an alert indicative of the recognized pattern.

The systems and methods for dynamic extraction and analysis of data described herein provide various technical improvements over traditional data extraction and analysis techniques, and solve various technical problems. For instance, the systems and methods for dynamic extraction and analysis of data described herein provide for increased throughput of data to extract, normalize, merge, process, validate, and/or analyze. The systems and methods for dynamic extraction and analysis of data described herein also provide for extraction, normalizing, merging, processing, validation, and/or analysis of data dynamically in real-time as data stores continue to receive data and the data continues to be extracted, normalized, merged, processed, and/or validated. The systems and methods for dynamic extraction and analysis of data described herein also improve security by reducing the amount of data that is being conveyed over network(s) using filtering schemes and scripts designed to only extract the data that meets the requirements of the filtering schemes. The systems and methods for dynamic extraction and analysis of data described herein also thereby improve overall system efficiency and reduce bandwidth usage by not transferring data that does not meet the requirements of the filtering scheme. These increases in efficiency can be significant, given the large volumes of data that can be stored collectively at the various data stores.

FIG. 1 is a block diagram 100 illustrating a system architecture for a special-purpose analysis system 190. The special-purpose analysis system 190 may be a special-purpose computer system with one or more special-purpose computers designed to include hardware for running an extraction engine 125 (based on a filtering scheme 130), a processing engine 140 and analysis engine 150 (based on an output scheme 145), a script generator 135, an AI engine 155, a pattern recognition engine 160, one or more machine learning (ML) models 165, an alert engine 175, connection (s) with a data lake 105, connection(s) with data store(s) (e.g., data store 110, data store 115, data store 120), connection(s) with a recipient device 180, or a combination thereof. The special-purpose analysis system 190 includes an extraction engine 125 that is configured to, and can, extract data from various data stores (e.g., data lake 105, data store 110, data store 115, and/or data store 120) according to the parameters of the various data stores and/or according to a filtering scheme 130. The data extracted from the data stores can be a subset of the data that is stored on the data stores, and can be selected for extraction based on the filtering scheme 130. In some examples, at least a portion of the filtering scheme 130 can be received via a user interface (e.g., the user interface 205 of FIG. 2, the user interface 305A of FIG. 3A, the user interface 305B of FIG. 3B, the user interface 540 of FIG. 5A, and/or the user interface 545 of FIG. 5B). In some examples, at least a portion of the filtering scheme 130 can be generated, for example using the artificial intelligence (AI) engine 155, the machine learning (ML) model(s) 165, or a combination thereof. In some examples, the special-purpose analysis system 190 may be referred to as an analysis system.

The data that is stored in the data stores, and that is extracted by the extraction engine 125, can include transaction data associated with various transactions, financial data associated with various financial accounts, demographic information associated with users themselves, or combinations thereof. For example, the data can include information about purchases by users from merchants, rentals or leases by users from merchants, payments transferred between from one user to another, loans taken by users from financial institutions, credit card information of a user, debit card information of a user, credit card transactions by a user, debit card transactions by a user, credit accounts of users, credit limits of users, debit accounts of users, transaction histories of users, credit limits of users, Fair Isaac Corporation (FICO)® credit scores of the users, credit bureau ratings (CBR) of users, VantageScores® of users, Stripe® Radar® scores of users, or combinations thereof.

In some examples, the filtering scheme 130 can filter which data is to be extracted from the data stores based on aspects such as data falling within a date range, data falling outside of a date range, data from before an upper bound date threshold, data from after a lower bound date threshold, data from a specified dataset, data corresponding to a specified process, data corresponding to a specified engine, data having at least a specified number of occurrences and/or observations and/or data records to be extracted, data corresponding to a specified engine, data corresponding to a specified level of user permissions, data corresponding to a specified level of user authorization, data corresponding a specified client number, data corresponding a specified system number, data corresponding a specified personal registration identification number (PRIN), data corresponding at least a specified number of days since open, data corresponding a specified authentication strategy, data corresponding a specified authorization strategy, data corresponding a specified fraud strategy, data corresponding a specified fraud detection strategy, data corresponding a specified dynamic engine, data corresponding a specified static engine, data corresponding a specified final decision (e.g., whether to grant a line of credit), data corresponding to user(s) with at least a specified credit bureau rating (CBR) score, data corresponding to user(s) with at least a specified behavior score, data corresponding to at least a specified number of months on book (MOB), any other filtering parameters corresponding to whether specified types of data listed above as being stored in the data stores exceed or fall below a corresponding threshold, any other filtering parameters illustrated or described herein (e.g., with respect to the user interface 205 of FIG. 2, the user interface 305A of FIG. 3A, the user interface 305B of FIG. 3B, the user interface 540 of FIG. 5A, and/or the user interface 545 of FIG. 5B), or a combination thereof.

The parameters a particular data store can be associated with the type, category, configuration, data structure(s) used, overall architecture, hardware architecture, and/or software architecture of the data store. Different types of data stores have different parameters. For instance, the parameters of a data store can be different based on whether the data store is a relational database (e.g., a structured query language (SQL) database such as MySQL), a non-relational database (e.g., a NoSQL database), a data lake, a data warehouse, a data mart, statistical analysis software (SAS), a service that can output data (e.g., a software-as-a-service (SaaS)), a hashmap, a hashgraph, a directed acyclic graph (DAG), a table, a spreadsheet, a document store, a wide column store, a key-value store, a message queue, a heap, a tree, a list, an array, an arraylist, a matrix, a pivot table, a full-text search engine, a search engine, a dictionary, a distributed ledger (e.g., blockchain ledger or DAG ledger), a ledger, a MapReduce cluster, a distributed system, or a combination thereof.

The special-purpose analysis system 190 includes a script generator 135 that is configured to, and can, generate scripts for the extraction engine 125 based on the respective parameters of the various data stores (e.g., data lake 105, data store 110, data store 115, and/or data store 120). For instance, the script generator 135 can generate one or more scripts per data store, with the scripts configured to extract data from that data store according to the filtering scheme 130. The scripts can include shell scripts, python scripts, visual basic (VBA) scripts, PySpark scripts, PROC SQL procedures, SAS functionality, SaaS requests, database queries, U-SQL scripts, T-SQL scripts, scripts and/or queries specific any of the types of data store listed above, or combinations thereof. The scripts can be generated to encode various limits, ranges, thresholds, and/or other values from the filtering scheme 130, so that the extraction engine 125 only receives and/or extracts the subset of data from the data stores that meets the requirements of the filtering scheme 130. In some examples, the scripts are executed at the special-purpose analysis system 190, for instance at server(s) that include the extraction engine 125 and control the types of queries and/or requests that the special-purpose analysis system 190 sends to the data stores for extraction of the data. In some examples, the scripts are sent from the extraction engine 125 to the respective data stores, and are executed at the data stores, so that the data stores can automatically send data to the extraction engine 125 according to the scripts without the extraction engine 125 needing to send anything further to the data stores. In some examples, the scripts are sent from the extraction engine 125 to an intermediary server between the extraction engine 125 and the data stores.

Use of the filtering scheme 130 by the extraction engine 125 and the script generator 135 in the ways described herein can provide improved security by reducing the amount of data that is being conveyed over network(s) to the extraction engine 125, reducing the chances that such data could be intercepted by a malicious party. Use of the filtering scheme 130 by the extraction engine 125 and the script generator 135 in this way can also improve overall system efficiency and reduce bandwidth usage by not transferring data that does not meet the requirements of the filtering scheme 130. These increases in efficiency can be significant, given the large volumes of data that can be stored collectively at the various data stores.

The special-purpose analysis system 190 includes a processing engine 140 that is configured to, and can, process the data that is extracted from the data stores. For instance, in some examples, the processing engine 140 can normalize the data that is extracted from the data stores according to an output scheme 145. In some examples, the processing engine 140 can merge the data that is extracted from the data stores according to the output scheme 145. The output scheme 145 can refer aspects of how an output dataset 170 is to be formatted, processed, and/or analyzed. In some examples, the output scheme 145 can indicate that the output dataset 170 is to be output as a spreadsheet, such as a comma separated values (CSV) file, a Microsoft® Excel® file, a Google® Sheets®, and/or an Apple® Numbers® file. In some examples, the output scheme 145 can indicate that the output dataset 170 is to be output as a database, such as a relational database (e.g., an SQL database) or a non-relational database (e.g., a NoSQL database). In some examples, the output scheme 145 can indicate that the output dataset 170 is to be output as any of the types of data store listed above. In some examples, the output scheme 145 can indicate how certain data is to be formatted, reformatted, and/or converted, for instance what format to write dates in, what time zone to indicate time in, what currency to indicate funds in, whether to indicate temperatures in Fahrenheit or Celsius, and so forth. In some examples, the output scheme 145 can be identified using a user interface (e.g., the user interface 205 of FIG. 2, the user interface 305A of FIG. 3A, the user interface 305B of FIG. 3B, the user interface 540 of FIG. 5A, and/or the user interface 545 of FIG. 5B). In some examples, the output scheme 145 can be automatically identified by the special-purpose analysis system 190 (e.g., but the processing engine 140, the analysis engine 150, the AI engine 155, the ML model(s) 165, or a combination thereof) based on what the special-purpose analysis system 190 determines to be the best way to present the data in the output dataset 170. For instance, if the data extracted from the data stores has only one dimension after processing, the special-purpose analysis system 190 may determine that a list is the best way to present the data in the output dataset 170. If the data extracted from the data stores has two dimensions after processing, the special-purpose analysis system 190 may determine that a spreadsheet, matrix, or array is the best way to present the data in the output dataset 170. If the data extracted from the data stores has three or more dimensions after processing, the special-purpose analysis system 190 may determine that a database is the best way to present the data in the output dataset 170. In some examples, the processing engine 140 uses scripts generated by the script generator 135 for normalization of the data extracted from the data stores, merging of the data extracted from the data stores, and/or other processing of the data extracted from the data stores. In some examples, the output of the processing engine 140 is the output dataset 170. In some examples, the processing engine 140 is configured to output the output dataset 170 to the analysis engine 150, to the alert engine 175, to a recipient device 180, or a combination thereof.

Because new transactions occur regularly, the data stores can continue to receive and/or generate additional data over time. The scripts generated by the script generator 135 and used by the extraction engine 125 to extract data from the data stores according to the filtering scheme 130 can continue to extract data from the data stores according to the filtering scheme 130 dynamically (e.g., in real-time or with a small delay) as the data stores continue to receive additional data over time. This continual or periodic extraction as additional data continues to be received and/or generated at the data stores is one advantage of the scripts over a one-time query or request. As the extraction engine 125 continues to extract additional data from the data stores over time, the processing engine 140 can continue to normalize that additional data, merge that additional data into the output dataset 170, and/or otherwise process the additional data and/or the output dataset 170.

The special-purpose analysis system 190 includes an analysis engine 150 that is configured to, and can, analyze the data that is processed by the processing engine 140 (e.g., the output dataset 170 or a predecessor dataset). The analysis engine 150 uses the AI engine 155 of the special-purpose analysis system 190, including a pattern recognition engine 160 and/or one or more machine learning (ML) models 165. The pattern recognition engine 160 of the AI engine 155 can detect, recognize, and/or track patterns in the data that is extracted by the extraction engine 125 and/or processed by the processing engine 140 (e.g., in the output dataset 170).

The special-purpose analysis system 190 includes an alert engine 175 that is configured to, and can, generate one or more alerts, and provide the one or more alerts to at least one recipient device 180. In some examples, the alert engine 175 can generate the alerts based on pattern(s) detected, recognized, and/or tracked by the analysis engine 150, AI engine 155, the pattern recognition engine 160, and the ML model(s) 165. The one or more alerts can identify and/or otherwise be indicative of the patterns.

In some examples, the patterns detected, recognized, and/or tracked in the data by the pattern recognition engine 160 can include patterns indicative of fraud, or a fraud attempt, such as a pattern indicating repeated attempts at a transaction with slight variations in user-provided information in an attempt to identify correct information through a brute force attack. For instance, if the pattern recognition engine 160 detects that a malicious user is submitting various billing addresses with the same credit card information in an attempt to find the correct billing address through brute force, the pattern recognition engine 160 can determine this to be a pattern corresponding to a fraud attempt. In some examples, alert(s) generated and/or output by the alert engine 175 can include alerts indicating that fraud(s) and/or fraud attempt(s) have been detected, recognized, and/or tracked. In some examples, alert(s) generated and/or output by the alert engine 175 can include data from the output dataset 170 indicative of the fraud(s) and/or fraud attempt(s) that have been detected, recognized, and/or tracked using the pattern recognition engine 160.

In some examples, the patterns detected, recognized, and/or tracked in the data by the pattern recognition engine 160 can include deviations, mismatches, discrepancies, and/or disparities between data from different data sets and/or from different data stores. For instance, two or more data stores can both include information about a specific transaction, such as a transaction between a customer and a merchant. In some examples, one data store corresponding to the merchant can include one set of information about the transaction (e.g., the merchant-side information), while another data store corresponding to the customer can include another set of information about the transaction (e.g., the customer-side information). If these different pieces of information about the same transaction do not agree (e.g., the pattern recognition engine 160 detects deviations, mismatches, discrepancies, and/or disparities between the different sets of information), then the pattern recognition engine 160 can identify a pattern of these deviations, mismatches, discrepancies, and/or disparities. In some examples, the pattern recognition engine 160 can identify the deviations, mismatches, discrepancies, and/or disparities through bitwise comparisons of data. In some examples, the pattern recognition engine 160 can identify the deviations, mismatches, discrepancies, and/or disparities through comparisons of hashes of data. In some examples, the deviations, mismatches, discrepancies, and/or disparities identified by the pattern recognition engine 160 are in values calculated based on the data extracted from the data stores, for instance including averages, sums, products, ratios, and the like.

In some examples, such deviations, mismatches, discrepancies, and/or disparities represent honest mistakes that can be corrected. In some examples, such deviations, mismatches, discrepancies, and/or disparities represent data that is stored differently (e.g., different format) in different data stores and/or systems, in which case the special-purpose analysis system 190 (e.g., the processing engine 140 and/or the analysis engine 150) can reformat, normalize, and/or otherwise process the data to correct the deviations, mismatches, discrepancies, and/or disparities. In some examples, such deviations, mismatches, discrepancies, and/or disparities can represent fraud, or fraud attempts. In some examples, alert(s) generated and/or output by the alert engine 175 can include alerts indicating that deviations, mismatches, discrepancies, and/or disparities have been detected, recognized, tracked, and/or corrected. In some examples, alert(s) generated and/or output by the alert engine 175 can include data from the output dataset 170 indicative of the deviations, mismatches, discrepancies, and/or disparities have been detected, recognized, tracked, and/or corrected using the pattern recognition engine 160, the processing engine 140, and/or the analysis engine 150.

In some examples, the patterns detected, recognized, and/or tracked in the data by the pattern recognition engine 160 can include trends in the data, for example indicating that a particular value (e.g., average amount spent over a period of time, CBR score, or any value corresponding to any of the types of data listed as being stored in the data stores) is increasing according to a specified trend line or trend curve, is decreasing according to a specified trend line or trend curve, is staying the same, or is vacillating according to a specified trend curve (e.g., a sinusoidal curve). In some examples, alert(s) generated and/or output by the alert engine 175 can include alerts indicating that the trend has been detected, recognized, and/or tracked. In some examples, alert(s) generated and/or output by the alert engine 175 can include alerts indicating the trend (e.g., the price of this product is going up exponentially) and/or a prediction based on the trend (e.g., the price of this product is predicted to exceed a threshold amount by 2024). In some examples, alert(s) generated and/or output by the alert engine 175 can include data from the output dataset 170 indicative of the trend that has been detected, recognized, and/or tracked using the pattern recognition engine 160.

In some examples, the pattern recognition engine 160 detects, recognizes, and/or tracks the patterns in the data using one or more decision trees. In some examples, the pattern recognition engine 160 detects, recognizes, and/or tracks the patterns in the data using one or more ML model(s) 165, such as the ML model(s) 725 of FIG. 7. The AI engine 155, the pattern recognition engine 160, and/or the ML model(s) 165 can include for example, one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more classifiers, one or more computer vision systems, one or more deep learning systems, or combinations thereof. In some examples, the AI engine 155, the pattern recognition engine 160, and/or the ML model(s) 165 use scripts generated by the script generator 135 for detecting, recognizing, and/or tracking patterns within the data that is extracted by the extraction engine 125 and/or processed by the processing engine 140 (e.g., in the output dataset 170). In some examples, the AI engine 155 can train the ML model(s) 165 to recognize patterns based on training data that includes pre-recognized patterns in a dataset formatted according to the output scheme 145 or a similar output scheme.

Figure 7:
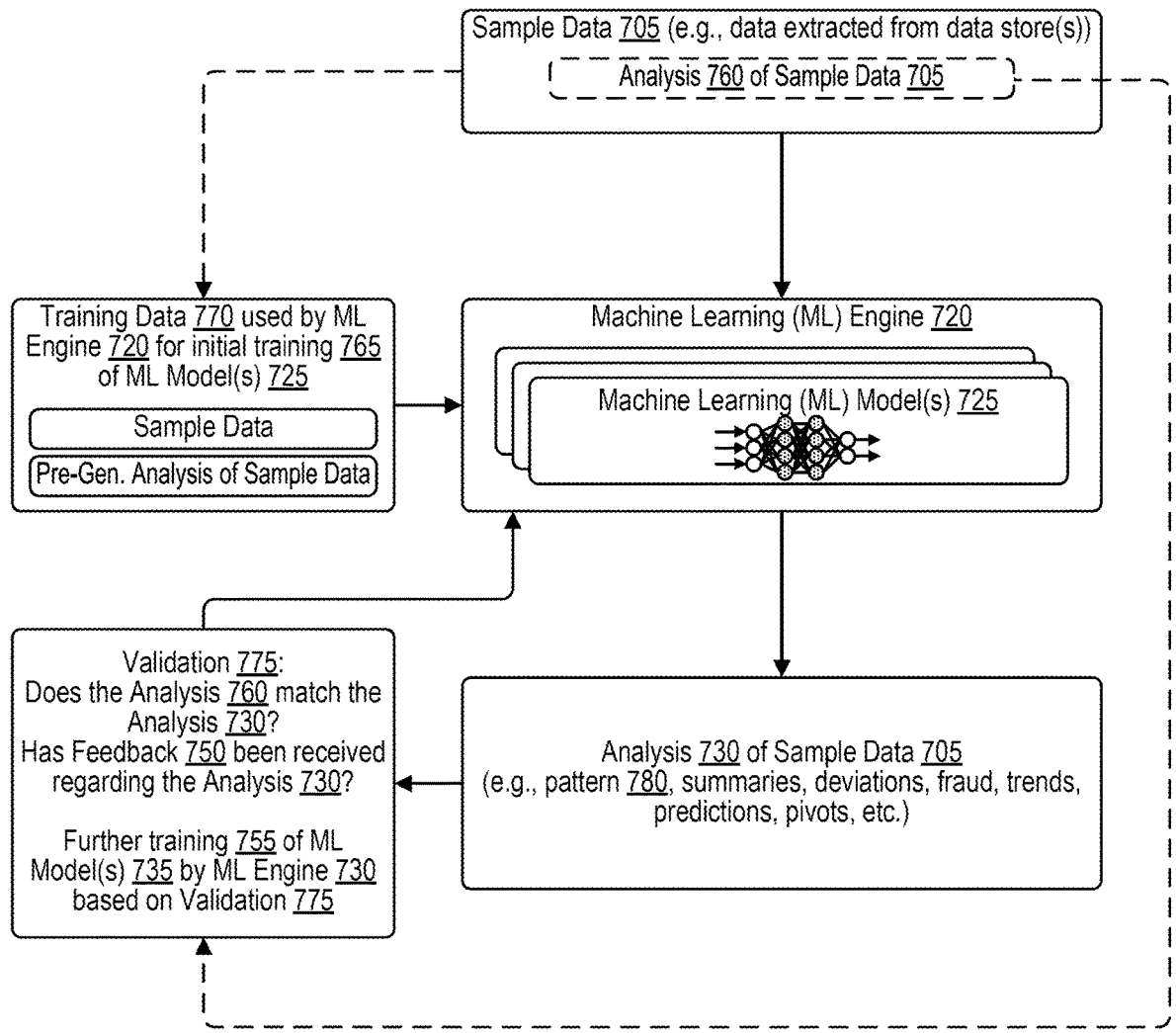
FIG. 7 is a block diagram illustrating using one or more machine learning models of a machine learning engine to analyze data to recognize a pattern, in accordance with some examples.

In some examples, feedback from the recipient device 180 about the alert, the output dataset 170, and/or the pattern can be received by the AI engine 155, and can allow the patterns that were detected, recognized, and/or tracked by the pattern recognition engine 160 to be used as further training data to update the training of the ML model(s) 165 with (e.g., see validation 775 and further training 755 in FIG. 7). The feedback can be positive feedback, for instance indicated by a positive reaction by the user of the recipient device 180 via a user interface, and/or indicated by the fact that the recipient device 180 (and/or the user thereof) decided to use the pattern and/or alert for some further application. Positive feedback can also be based on attributes of the sensor data from sensor(s) of the recipient device 180, such as the user smiling, laughing, nodding, saying a positive statement (e.g., "yes," "confirmed," "okay," "next"), or otherwise positively reacting to the alert, the output dataset 170, and/or the pattern. Positive feedback can be used to strengthen and/or reinforce weights associated with the alert, the output dataset 170, and/or the pattern in the ML model(s) 165, and/or to weaken or remove other weights other than those associated with the alert, the output dataset 170, and/or the pattern in the ML model(s) 165.

The feedback can be negative feedback, for instance indicated by a negative reaction by the user of the recipient device 180 via a user interface, and/or indicated by the fact that the recipient device 180 (and/or the user thereof) declined to use the pattern and/or alert for some further application. Negative feedback can also be based on attributes of the sensor data from sensor(s) of the recipient device 180, such as the user frowning, crying, shaking their head (e.g., in a "no" motion), saying a negative statement (e.g., "no," "negative," "bad," "not this"), or otherwise negatively reacting to the alert, the output dataset 170, and/or the pattern. Negative feedback can be used to weaken and/or remove weights associated with the alert, the output dataset 170, and/or the pattern in the ML model(s) 165, and/or to strengthen and/or reinforce other weights other than those associated with the alert, the output dataset 170, and/or the pattern in the ML model(s) 165.

In some examples, the output dataset 170 can be output by the analysis engine 150 and/or the alert engine 175 (e.g., to the recipient device 180) in addition to or instead of output by the processing engine 140. In some examples, the analysis engine 150 and/or the alert engine 175 can modify the data output by the processing engine 140 (e.g., the output dataset 170) to identify the pattern within the output dataset 170. For instance, the analysis engine 150 and/or the alert engine 175 can highlight the data corresponding to the pattern in the output dataset 170, generate a separate dataset that just includes the data relevant to the pattern, add one or more graphs or charts indicative of the pattern, or some combination thereof.

In some examples, the analysis engine 150 can also analyze the data to summarize the data, with the output dataset 170 and/or the alerts generated by the alert engine 175 including the summaries. In some examples, the summaries can identify information that may be important for making strategic decisions, such as CBR scores, reactivation data, counts of incidents where a value in the data crosses one or more thresholds associated with one or more rules, overlimit incidents where a value in the data crosses one or more limits associated with one or more financial institutions, version numbers, a territory (e.g., continent, country, county, city, area code, zip code, street, block) that a transaction took place in, whether a transaction took place online or in a physical store, or a combination thereof. In some examples, the summaries can include sums, averages, products, ratios, and/or other calculations determined based on values in the data, for instance as in a pivot table or pivot chart. In some examples, the summaries can include graphs and/or charts generated based on the data. The graphs and/or charts can be updated dynamically (e.g., in real-time and/or with a delay) as additional data is received and/or generated at the data stores, as the additional data is extracted from the data stores by the extraction engine 125, as the additional data is processed by the processing engine 140, and/or as the additional data is analyzed by the analysis engine 150 (e.g., to detect, recognize, and/or track patterns using the pattern recognition engine 160 and/or the ML model(s) 165).

In some examples, the analysis engine 150 can determine, during or after extraction and/or processing of data from the data stores using the extraction engine 125 and/or the processing engine 140, that certain data (e.g., about certain transactions and/or users) is missing from the data that is extracted and/or processed using the extraction engine 125 and/or the processing engine 140. In some examples, the analysis engine 150 can identify a specific data store that the analysis engine 150 expects to store the missing information, can cause the script generator to generate a script for extracting the missing data from the identified data store, and can cause the extraction engine 125 to extract the missing data from the identified data store using the generated script and in accordance with the filtering scheme 130.

As indicated previously, the data stores can continue to receive additional data over time. Further, the extraction engine 125 and processing engine 140 can continue to extract and process that data, respectively, to add it into the output dataset 170 dynamically (e.g., in real-time or with a delay). In some examples, the analysis engine 150 can also analyze the additional data dynamically (e.g., in real-time or with a delay) as the additional data comes in from the data stores, the extraction engine 125, and/or the processing engine 140. Thus, in some examples, the pattern recognition engine 160 might not detect, recognize, and/or track a particular pattern until a time period after the analysis system initially starts to extract, process, and analyze data from the data stores, for instance because the data corresponding to the pattern is received and/or generated at the data stores the time period after the analysis system initially starts to extract, process, and analyze data from the data stores. In some examples, the pattern recognition engine 160 can track a pattern over time as the pattern develops, for instance developing an increasingly refined and/or accurate set of one or more trend lines and/or trend curves corresponding to the pattern over time. For instance, in some examples, the pattern recognition engine 160 can track and identify an uptick in fraud attempts at certain times of year, and the alert(s) from the alert engine 175 can indicate this. In some examples, the alert engine 175 can also generate alert(s) based on the detected, recognized, and/or tracked pattern(s) dynamically (e.g., in real-time or with a delay) as the additional data comes in at the data stores, as the additional data is extracted from the data stores by the extraction engine 125, as the additional data is processed by the processing engine 140, and/or as the additional data is analyzed by the analysis engine 150 (e.g., to detect, recognize, and/or track patterns using the pattern recognition engine 160 and/or the ML model(s) 165).

In some examples, the script generator 135 uses the AI engine 155, the pattern recognition engine 160, and/or the ML model(s) 165 to generate the scripts for use by the extraction engine 125, the processing engine 140, and/or the analysis engine 150. For instance, the AI engine 155, the pattern recognition engine 160, and/or the ML model(s) 165 can work best when the data is extracted using a certain process or in a certain format, which may inform the script generator 135 while the script generator 135 is generating the scripts, to use that process and/or format for the scripts to be used by the extraction engine 125.

Figure 2:
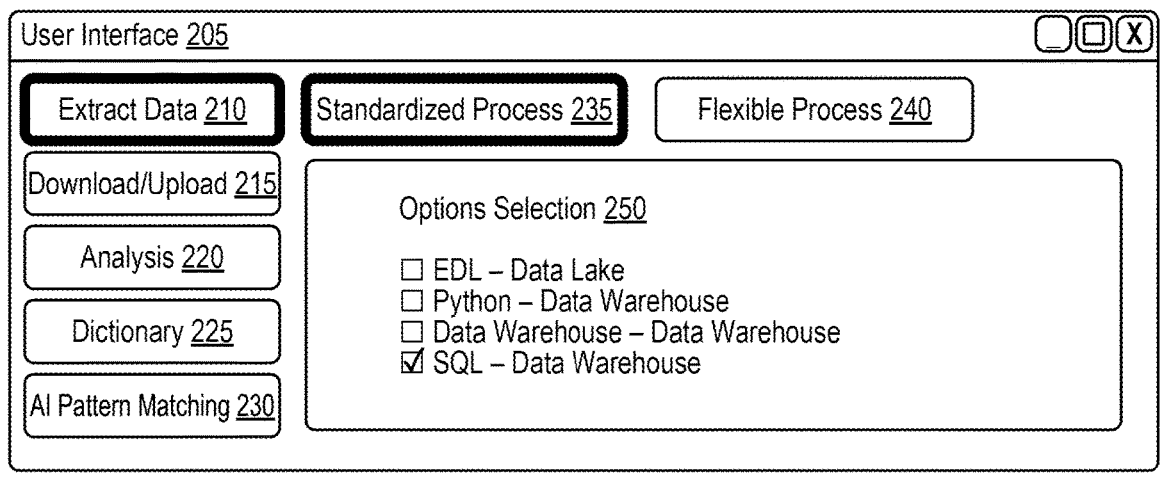
FIG. 2 is a conceptual diagram illustrating a user interface for a data extraction engine of a special-purpose analysis system, in accordance with some examples.

FIG. 2 is a conceptual diagram 200 illustrating a user interface 205 for a data extraction engine 125 of a special-purpose analysis system 190. The user interface 205 includes tabs representing different processes that the special-purpose analysis system 190 can perform on, or with, data from various data stores (e.g., data lake 105, data store 110, data store 115, and/or data store 120). These processes include extract data 210, download/upload 215, analysis 220, dictionary 225, and AI pattern matching 230. The extract data 210 process is selected, as indicated by the thick outline of the extract data 210 tab. The extract data 210 process involves extracting data from the data stores using the extraction engine 125.

Within the extract data 210 process, two sub-processes are presented as options to the user via the user interface 205, for instance including a standardized process 235 and a flexible process 240. The standardized process 235 is selected, as indicated by the thick outline of the standardized process 235 tab. In the standardized process 235, the filtering scheme 130 and the script(s) generated by the script generator 135 for use by the extraction engine 125 are maintained over time. In the flexible process 240, the filtering scheme 130 and/or the script(s) generated by the script generator 135 for use by the extraction engine 125 can be modified dynamically, and the type of data being extracted using the extraction engine 125 can be modified over time.

For instance, under the flexible process 240, the filtering scheme 130 and/or the script(s) can include variables that can by modified on the fly, in turn dynamically modifying what the type of data being extracted using the extraction engine 125. The variables can correspond to options in the options selection 250, the various fields of the user interfaces 305A-305B, options in the user interface 540, options in the user interface 545, or a combination thereof. For instance, a user can set, in the filtering scheme 130, an initial date range to extract data within, and can set an initial client number of a client to extract data about. Under the flexible process 240, the user can later change the data range in the filtering scheme 130 to extract the data within (e.g., to expand the date range, to contract the date range, and/or to move either or both ends of the date range), and the extraction engine 125 can dynamically adjust to extract data in the new date range. Under the flexible process 240, the user can later change the client number of the client to extract data about (e.g., to add another client number, to change the client number to a different client number, and/or to remove the client number) and the extraction engine 125 can dynamically adjust to extract data about the client(s) identified by the changed client number(s).

The user interface 205 includes an options selection 250 section for the standardized process 235 of the extract data 210 process. The options selection 250 section includes several options identifying types of data stores to extract data from and/or techniques to use for extraction, include enterprise data lake (EDL), data lake, data warehouse, python, and SQL database. In the example of the user interface 205 illustrated in FIG. 2, the SQL and data warehouse option is selected.

Figure 5A:
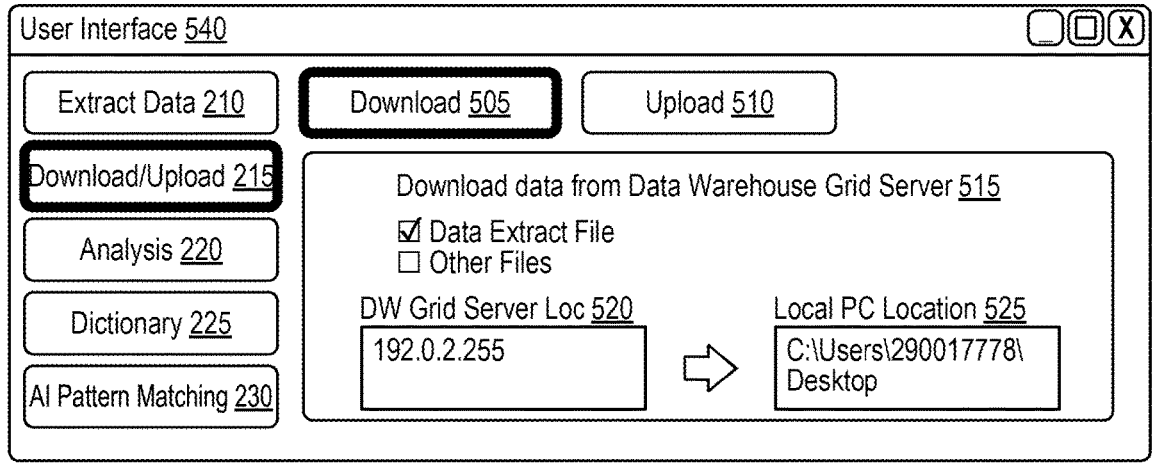
FIG. 5A is a conceptual diagram illustrating a user interface indicating a download scheme for a data extraction engine of a special-purpose analysis system, in accordance with some examples.
Figure 5B:
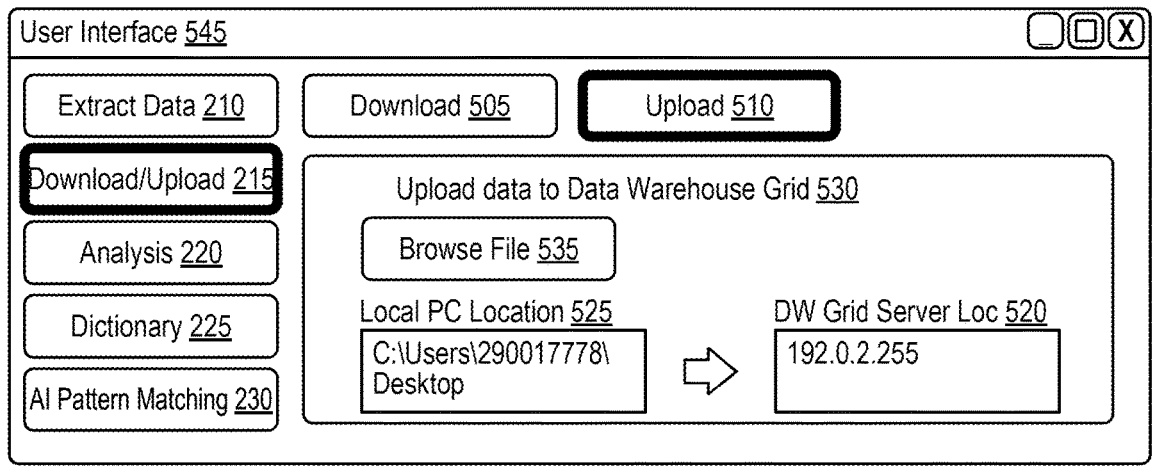
FIG. 5B is a conceptual diagram illustrating a user interface indicating an upload scheme for the special-purpose analysis system, in accordance with some examples.

User interfaces for the download/upload 215 process (e.g., user interface 540 and user interface 545) are illustrated in FIGS. 5A-5B, and also specify details of the data extraction process by the extraction engine 125. User interface(s) for the AI pattern matching 230 include settings for operations by the pattern recognition engine 160, the ML model(s) 165, the AI engine 155, the analysis engine 150, and/or the alert engine 175, such as selections of which types of patterns to look for and/or alert the user about (e.g., fraud, fraud attempts, trends, predictions, deviations, mismatches, discrepancies, disparities, or combinations thereof), selections of which data to look for patterns in, or combinations thereof. User interface(s) for the analysis 220 process include settings for operations by the analysis engine 150, the alert engine 175, the pattern recognition engine 160, the ML model(s) 165, and/or the AI engine 155, such as selections of which data to analyze, which types of analyses to run, and/or what types of outputs to receive.

FIG. 3A is a conceptual diagram illustrating a user interface 305A indicating a first filtering scheme for a data extraction engine 125 of a special-purpose analysis system 190. The first filtering scheme of FIG. 3A is an example of the filtering scheme 130. The user interface 305A includes a "run" button that directs the extraction engine 125 to commence extraction according to the first filtering scheme.

The user interface 305A illustrates that the user has filled in certain values for certain fields. The user interface 305A includes a dataset name 310 field filled in with the value "Data1." The user interface 305A includes a process 315 field filled in with the value "AUTH." The user interface 305A includes a num of obs. 320 field (e.g., number of occurrences and/or observations and/or data records to be extracted) filled in with the value "10000," indicating that the data must include at least 10000 occurrences, observations, and/or entries. The user interface 305A includes an engine name 325 field filled in with the value "AFDYC01." The user interface 305A includes a date from 330 field filled in with the value "1 Aug. 2021," to indicate a lower bound date threshold. The user interface 305A includes a date to 335 field filled in with the value "10 Aug. 2021," to indicate an upper bound date threshold. The user interface 305A includes a client number 340 field filled in with the value "101256," to indicate a specific client. The user interface 305A also includes a number of fields that are not filled in, including system number 345, personal registration identification number (PRIN) 350, minimum days since open 355, authentication and/or authorization strategy 360, fraud strategy and/or fraud detection strategy 365, dynamic engine number 370, static engine number 375, final decision 380 (e.g., whether to grant a line of credit), minimum credit bureau rating (CBR) score 385, minimum behavior score 390, and minimum number of months on book (MOB) 395.

FIG. 3B is a conceptual diagram illustrating a user interface 305B indicating a second filtering scheme for the data extraction engine 125 of the special-purpose analysis system 190. The second filtering scheme of FIG. 3B is an example of the filtering scheme 130. The user interface 305B includes a "run" button that directs the extraction engine 125 to commence extraction according to the second filtering scheme.

The user interface 305A illustrates that the user has filled in certain values for certain fields. The user interface 305A includes a dataset name 310 field filled in with the value "Data2." The user interface 305A includes a process 315 field filled in with the value "AUTH." The user interface 305A includes a num of obs. 320 field (e.g., number of occurrences and/or observations and/or data records to be extracted) filled in with the value "10000," indicating that the data must include at least 10000 occurrences, observations, and/or entries. The user interface 305A includes an engine name 325 field filled in with the value "AFDYC-GAS." The user interface 305A includes a date from 330 field filled in with the value "2 Jul. 2021," to indicate a lower bound date threshold. The user interface 305A includes a date to 335 field filled in with the value "20 Jul. 2021," to indicate an upper bound date threshold. The user interface 305A includes a client number 340 field filled in with the value "6115681," to indicate a specific client. The user interface 305A also includes a number of fields that are not filled in, including system number 345, personal registration identification number (PRIN) 350, minimum days since open 355, authentication and/or authorization strategy 360, fraud strategy and/or fraud detection strategy 365, dynamic engine number 370, static engine number 375, final decision 380 (e.g., whether to grant a line of credit), minimum credit bureau rating (CBR) score 385, minimum behavior score 390, and minimum number of months on book (MOB) 395.

Figure 4:
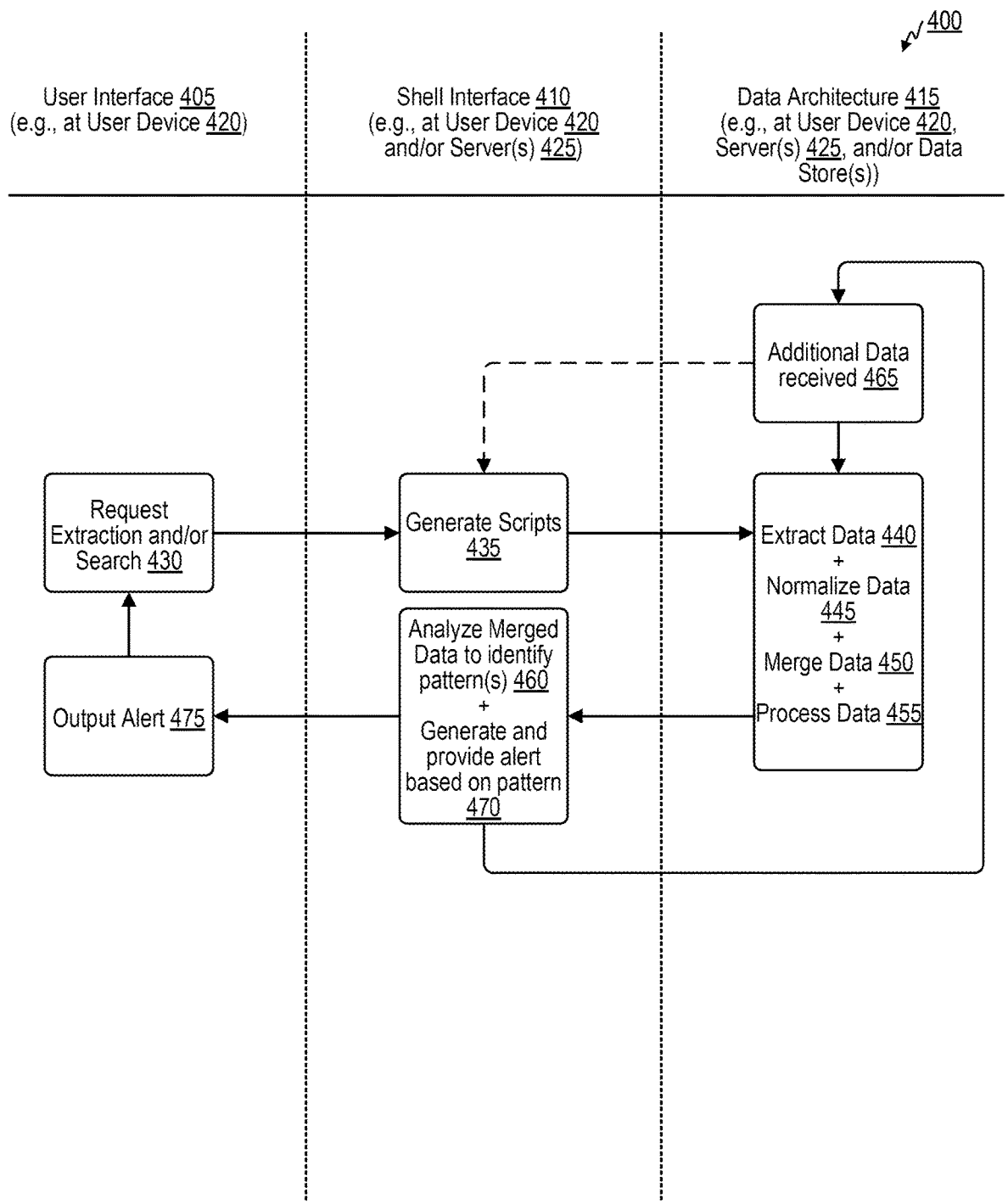
FIG. 4 is a swim lane diagram illustrating operations and interactions between different aspects of a special-purpose analysis system, including a user interface, a shell interface, and a data architecture, in accordance with some examples.

FIG. 4 is a swim lane diagram illustrating operations and interactions between different aspects of a special-purpose analysis system 190, including a user interface 405, a shell interface 410, and a data architecture 415. The user interface 405 may be at a user device 420, which in some examples is also a recipient device 180. Examples of the user interface 405 include the user interface 205 of FIG. 2, the user interface 305A of FIG. 3A, the user interface 305B of FIG. 3B, the user interface 540 of FIG. 5A, and/or the user interface 545 of FIG. 5B.

At operation 430, through the user interface 405, the user device 420 requests an extraction and/or search, for instance by identifying a filtering scheme 130 (e.g., via the user interface 205 of FIG. 2, the user interface 305A of FIG. 3A, the user interface 305B of FIG. 3B, the user interface 540 of FIG. 5A, and/or the user interface 545 of FIG. 5B).

The shell interface 410, in some examples, includes the script generator 135, the scripts generated by the script generator 135, the analysis engine 150, the AI engine 155, the pattern recognition engine 160, the ML model(s) 165, the alert engine 175, combinations thereof, and/or interface(s) thereto. The shell interface 410 can be at the user device 420, a set of one or more servers 425 (e.g., of the special-purpose analysis system 190), or a combination thereof.

At operation 435, the shell interface 410, through the user device 420 and/or the server(s) 425, generates scripts (e.g., as in the script generator 135) for extracting, processing, and/or analyzing the data from the data stores.

The data architecture 415, in some examples, includes the extraction engine 125, the processing engine 140, the analysis engine 150, the AI engine 155, the pattern recognition engine 160, the ML model(s) 165, the alert engine 175, or combinations thereof. The data architecture 415 can be at the user device 420, the server(s) 425, and/or data stores (e.g., data lake 105, data store 110, data store 115, and/or data store 120).

At operation 440, the data architecture 415 extracts data according to the scripts generated at operation 435 and/or the filtering scheme 130 provided in operation 430, for instance as discussed with respect to the extraction engine 125. At operation 445, the data architecture 415 normalizes the extracted data, for instance as discussed with respect to the processing engine 140. In some examples, the data architecture 415 normalizes the extracted data according to the scripts generated at operation 435 and/or an output scheme 145 provided in operation 430 and/or identified as appropriate at the data architecture 415. At operation 450, the data architecture 415 merges the extracted and/or normalized data, for instance as discussed with respect to the processing engine 140. In some examples, the data architecture 415 merges the extracted and/or normalized data according to the scripts generated at operation 435 and/or an output scheme 145 provided in operation 430 and/or identified as appropriate at the data architecture 415, for instance as discussed with respect to the processing engine 140. At operation 455, the data architecture 415 processes the extracted and/or normalized and/or merged data, for instance as discussed with respect to the processing engine 140. In some examples, the data architecture 415 processes the extracted and/or normalized and/or merged data according to the scripts generated at operation 435 and/or an output scheme 145 provided in operation 430 and/or identified as appropriate at the data architecture 415, for instance as discussed with respect to the processing engine 140.

At operation 460, the shell interface 410 analyzes the extracted, normalized, merged, and/or processed data to identify, detect, recognize, and/or track pattern(s) in the data, for instance as discussed with respect to the analysis engine 150, the AI engine 155, the pattern recognition engine 160, and/or the ML model(s) 165.

At operation 465, additional data is received at the data architecture 415, for instance at the data stores of the data architecture 415. The data architecture 415 (e.g., the extraction engine 125 and the processing engine 140) extracts, normalizes, merges, and/or processes the additional data as described above with respect to operation 440 through operation 455. The shell interface 410 analyzes the extracted, normalized, merged, and/or processed additional data as in operation 460. In some examples, the additional data can cause the shell interface 410 to also generate scripts as in operation 435, for instance if data is received at a new data store that the data architecture 415 was not previously extracting data from. This loop can continue, with more additional data continuing to be received, extracted, normalized, merged, processed, and/or analyzed, until, at operation 460, the shell interface 410 eventually identifies a pattern.

At operation 470, the shell interface generates an alert indicative of the pattern, and provides the alert to the user interface 405, as discussed with respect to the alert engine 175. At operation 475, the user interface 405 outputs the alert at the user device 420. In some examples, the user interface 405 outputs the alert to the user. In some examples, the user interface 405 outputs the alert to another application running on the user device 420, which can use to alert to perform another function (e.g., schedule a task associated with the pattern indicated by the alert, such as an investigation of fraud detection indicated by the alert).

FIG. 5A is a conceptual diagram illustrating a user interface 540 indicating a download scheme for a data extraction engine 125 of a special-purpose analysis system 190. The user interface 540 includes the same tabs representing different processes as illustrated in the user interface 205, namely extract data 210, download/upload 215, analysis 220, dictionary 225, and AI pattern matching 230. The download/upload 215 process is selected, as indicated by the thick outline of the download/upload 215 tab. The download/upload 215 process involves extracting data from the data stores using the extraction engine 125.

Within the download/upload 215 process, two sub-processes are presented as options to the user via the user interface 540, namely download 505 and upload 510. In the user interface 540, the download 505 process is selected, as indicated by the thick outline of the download 505 tab. Options are presented relating to a process 515 for downloading (e.g., extracting) data from a data warehouse grid server, including whether to download a data extract file or other files. A data warehouse grid server location 520 to download from is identified as 192.0.2.255. A local PC location 525 to download to is identified as C:\Users\2110017778\Desktop.

FIG. 5B is a conceptual diagram illustrating a user interface 545 indicating an upload scheme for the special-purpose analysis system 190. In the user interface 545, the upload 510 process is selected, as indicated by the thick outline of the upload 510 tab. Options are presented relating to a process 530 for uploading data to the data warehouse grid, including an option to browse for a file 535 to upload to the data warehouse grid. A local PC location 525 to upload from is identified as C:\Users\2110017778\Desktop. A data warehouse grid server location 520 to upload to is identified as 192.0.2.255.

Figure 6:
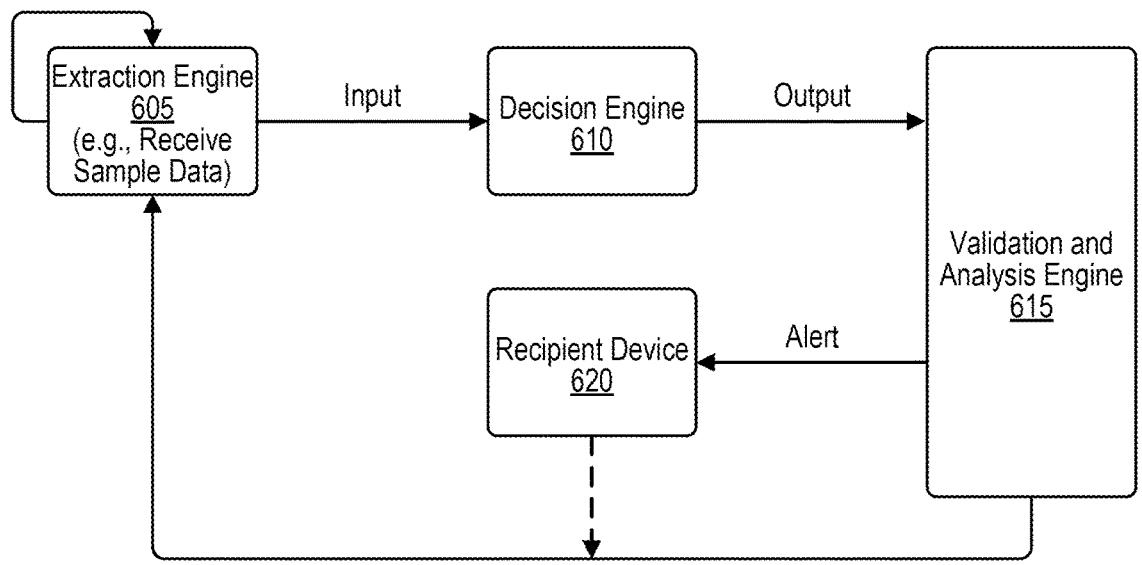
FIG. 6 is a block diagram illustrating operations and interactions between different aspects of a special-purpose analysis system, including an extraction engine, a decision engine, a validation and analysis engine, and a recipient device, in accordance with some examples.

FIG. 6 is a block diagram illustrating operations and interactions between different aspects of an analysis system 600, including an extraction engine 605, a decision engine 610, a validation and analysis engine 615, and a recipient device 620. The analysis system 600 is an example of the special-purpose analysis system 190. The extraction engine 605 can include the extraction engine 125 and/or the processing engine 140. The extraction engine 605 receives, extracts, normalizes, merges, and/or processes sample data from various data stores (e.g., data lake 105, data store 110, data store 115, and/or data store 120). The extraction engine 605 provides this data as input(s) to the decision engine 610.

The decision engine 610 can include the processing engine 140, the analysis engine 150, the AI engine 155, the pattern recognition engine 160, the ML model(s) 165, and/or the alert engine 175. Based on the data from the extraction engine 605, the decision engine 610 determines a strategy for making a particular decision, for instance regarding whether a user is creditworthy for a requested line of credit, whether data indicates fraud, whether trends in the data support a particular prediction, and the like. In some examples, the decision engine 610 can model, analyze, and/or predict an optimal course of action. In some examples, the decision engine 610 can change some of the data extracted and/or processed by the extraction engine 605. The output of the decision engine 610 can be provided to a validation and analysis engine 615.

The validation and analysis engine 615 can include the can include the processing engine 140, the analysis engine 150, the AI engine 155, the pattern recognition engine 160, the ML model(s) 165, and/or the alert engine 175. The validation and analysis engine 615 can validate the data output by the decision engine 610 by comparing the data output by the decision engine 610 with the data from the extraction engine 605 to ensure that there are no deviations, mismatches, discrepancies, and/or disparities between the data output by the decision engine 610 and the data from the extraction engine 605. The validation and analysis engine 615 can continue to seek out deviations, mismatches, discrepancies, and/or disparities dynamically (e.g., in real-time and/or with a delay) as additional data is received and/or generated at the data stores, as the additional data is extracted and/or processed by the extraction engine 605, as the additional data is analyzed and/or modified by the decision engine 610, and/or as the additional data is validated and/or analyzed by the validation and analysis engine 615. Any deviations, mismatches, discrepancies, and/or disparities found by the validation and analysis engine 615 can be reported via alert(s) to the recipient device 620. The recipient device 620 can be an example of the recipient device 180 and/or of the user device 420.

The validation and analysis engine 615 can also provide summaries of the data output by the decision engine 610 and/or the data extracted and/or processed by the extraction engine 605. In some examples, the summaries can identify information that may be important for making strategic decisions, such as CBR scores, reactivation data, counts of incidents where a value in the data crosses one or more thresholds associated with one or more rules, overlimit incidents where a value in the data crosses one or more limits associated with one or more financial institutions, version numbers, a territory (e.g., continent, country, county, city, area code, zip code, street, block) that a transaction took place in, whether a transaction took place online or in a physical store, or a combination thereof. In some examples, the summaries can include sums, averages, products, ratios, and/or other calculations determined based on values in the data, for instance as in a pivot table or pivot chart. In some examples, the summaries can include graphs and/or charts generated based on the data. The graphs and/or charts can be updated dynamically (e.g., in real-time and/or with a delay) as additional data is received and/or generated at the data stores, as the additional data is extracted and/or processed by the extraction engine 605, as the additional data is analyzed and/or modified by the decision engine 610, and/or as the additional data is validated and/or analyzed by the validation and analysis engine 615. In some examples, the data in the summaries can be reported via alert(s) to the recipient device 620.

FIG. 7 is a block diagram illustrating using one or more machine learning models 725 of a machine learning engine 720 to analyze data to recognize a pattern 780. Examples of the ML engine 720 include the AI engine 155. Examples of the ML model(s) 725 include the ML model(s) 165. The ML engine 720 generates, trains, and uses the ML model(s) 725 based on an initial training 765 using training data 770. The ML engine 720 trains the ML model(s) 725 to generate an analysis 730 on input of sample data 705 into the ML model(s) 725. The sample data 705 may include data that is extracted from the data stores (e.g., by the extraction engine 125, the shell interface 410, the data architecture 415, and/or the extraction engine 605). In some examples, the sample data 705 may include data that is normalized, merged, and/or processed following extraction (e.g., by the processing engine 140, the shell interface 410, the data architecture 415, and/or the extraction engine 605). In some examples, the sample data 705 may include decisioning data, strategy data, and/or modifications (e.g., by the decision engine 610). In some examples, the sample data 705 may include some preliminary validation data and/or analysis data, such as summary data (e.g., by the analysis engine 150, the shell interface 410, the data architecture 415, the decision engine 610, and/or the validation and analysis engine 615).

The analysis 730 output by the ML model(s) 725 can include at least one pattern 780 identified as part of the analysis 730 of the sample data 705. The pattern 780 can include any of the types of patterns discussed with respect to the pattern recognition engine 160, for instance including patterns associated with fraud, patterns associated with trends, and/or patterns associated with deviations, mismatches, discrepancies, and/or disparities. In some examples, the analysis 730 output by the ML model(s) 725 can include various other elements of analyses described herein as output by the analysis engine 150, the shell interface 410, the data architecture 415, the decision engine 610, and/or the validation and analysis engine 615. For instance, the analysis 730 output by the ML model(s) 725 can include summaries, deviations, mismatches, discrepancies, disparities, fraud detections, fraud attempt detections, trends, predictions based on trends, pivots, or combinations thereof.

The training data 770 that the ML engine 720 uses to train the ML model(s) 725 includes sample data (e.g., akin to the sample data 705) as well as pre-generated analyses corresponding to the sample data (e.g., akin to the analysis 730 corresponding to the sample data 705). Over the course of the initial training 765, the ML model(s) 725 develop hidden layers between input layers and output layers, and/or weights and/or connections between nodes of the various layers, that each relate to various aspects of the analysis 730, such as any of the aspects described herein (e.g., related to various types of patterns that can be detected and characteristics of those types of patterns).

In some examples, the ML engine 720 can continue to train and/or update the ML model(s) 725 over time, for instance based on validation 775 using the analysis 730 and the sample data 705. In some examples, an analysis 760 of the sample data 705 (separate from the analysis 730 generated by the ML model(s) 725) may be provided to the ML engine 720 to perform the validation 775 using. In some examples, the analysis 760 may be generated by a different entity than the ML model(s) 725, for instance a different set of ML model(s) (not pictured) or one or more trusted human analysts. If, during validation 775, the ML engine 720 determines that the analysis 730 generated by the ML model(s) 725 matches the analysis 760, the ML engine 720 can treat this as positive feedback, and can perform further training 755 of the ML model(s) 735 based on the analysis 730, the sample data 705, and/or the analysis 760, for instance to strengthen and/or reinforce weights associated with generating the analysis 730 in the ML model(s) 725, and/or to weaken or remove other weights other than those associated with generating the analysis 730, in the ML model(s) 725. If, during validation 775, the ML engine 720 determines that the analysis 730 generated by the ML model(s) 725 differs from the analysis 760, the ML engine 720 can treat this as negative feedback, and can perform further training 755 of the ML model(s) 735 based on the analysis 730, the sample data 705, and/or the analysis 760, for instance to weaken and/or remove weights associated with generating the analysis 730 in the ML model(s) 725, and/or to strengthen and/or reinforce other weights other than those associated with generating the analysis 730 in the ML model(s) 725.

In some examples, the ML engine 720 receives feedback 750 about the analysis 730. The feedback can include a reaction by a user of a user device (e.g., recipient device 180, user device 420, recipient device 620) via a user interface, a reaction by a user determined based on sensor data from a user device, and/or decisions by a user and/or user device as whether or not to use the analysis 730 for a further application. Positive feedback can be used to strengthen and/or reinforce weights associated with generating the analysis 730 in the ML model(s) 725, and/or to weaken or remove other weights other than those associated with generating the analysis 730 in the ML model(s) 725. Negative feedback can be used to weaken and/or remove weights associated with generating the analysis 730 in the ML model(s) 725, and/or to strengthen and/or reinforce other weights other than those associated with generating the analysis 730 in the ML model(s) 725.

Figure 8:
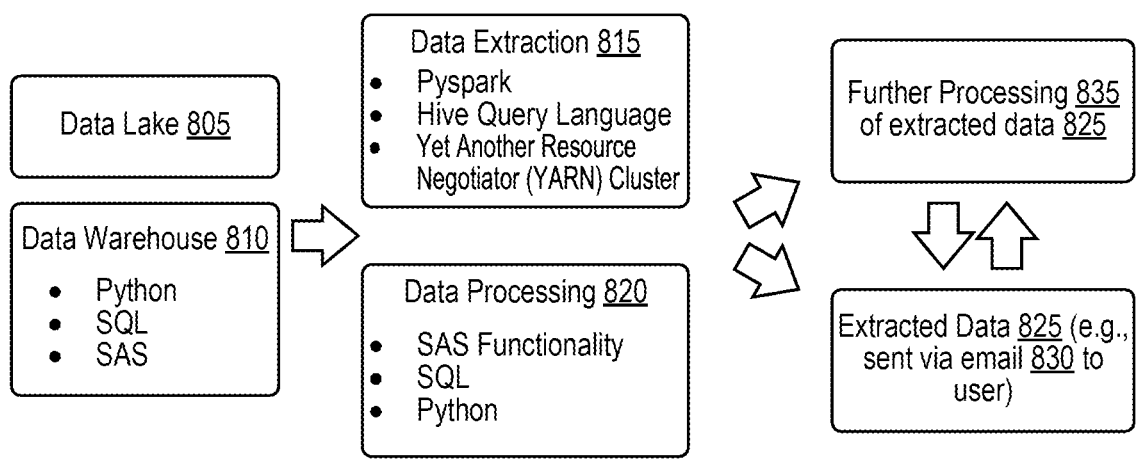
FIG. 8 is a flow diagram illustrating a process for data extraction and analysis using a special-purpose analysis system, in accordance with some examples.

FIG. 8 is a flow diagram illustrating a process 800 for data extraction and analysis using a special-purpose analysis system 190. The process 800 for data extraction and analysis includes extraction of data from a data lake 805, a data warehouse 810, or both. Various data extraction and processing channels, procedures, systems, and/or operations can be used in parallel to extract and/or process the data from the data lake 805 and/or the data warehouse 810. These parallel pathways for extracting and processing the data from the data lake 805 and/or the data warehouse 810 provide redundancy so that if one pathway's system (e.g., SAS) is down, then data can still be extracted and processed using another pathway or system (e.g., Python, SQL). The data extraction and processing systems include systems for data extraction 815 and/or data processing 820, including Pyspark, Hive Query Language, and Hadoop Yet Another Resource Negotiator (YARN) clusters, SAS functionality, SQL, Python, or combinations thereof.

In some examples, the special-purpose analysis system 190 can output the extracted data 825 to a user, for instance by displaying the extracted data 825 and/or by sending the extracted data 825 via an email 830, a phone call, a text message, a chat message, a notification, an alert, or another messaging or user interface channel. In some examples, the special-purpose analysis system 190 can perform further processing 835 of the extracted data 825, for example to identify an analysis using the analysis engine 150, to perform an AI-based analysis using the AI engine 155 and/or the ML model(s) 165, identify pattern(s) using the pattern recognition engine 160, normalize data per operation 445, merge data per operation 450, process data per operation 455, analyze merged data to identify pattern(s) per operation 460, generate and provide alert(s) based on identified pattern(s) per operation 470, performing an analysis using the decision engine 610 and/or the validation and analysis engine 615, generating an analysis 730 using the trained ML model(s) 725, identifying deviations 940 and/or a summary 945, recognizing a pattern as in operations 1025-1030, or a combination thereof. In some examples, the further processing 835 is performed on the extracted data 825 to modify the extracted data 825 before the extracted data 825 is output to the user (e.g., sent via the email 830). In some examples, the extracted data 825 is output to the user (e.g., sent via the email 830) before the further processing 835 is performed on the extracted data 825 to modify the extracted data 825, and then the extracted data 825 is output again (as modified via the further processing 835), for instance by displaying the extracted data 825 via a display or by sending the extracted data 825 to the user (e.g., via another email 830, a phone call, a text message, a chat message, a notification, an alert, or another messaging or user interface channel).

Figure 9:
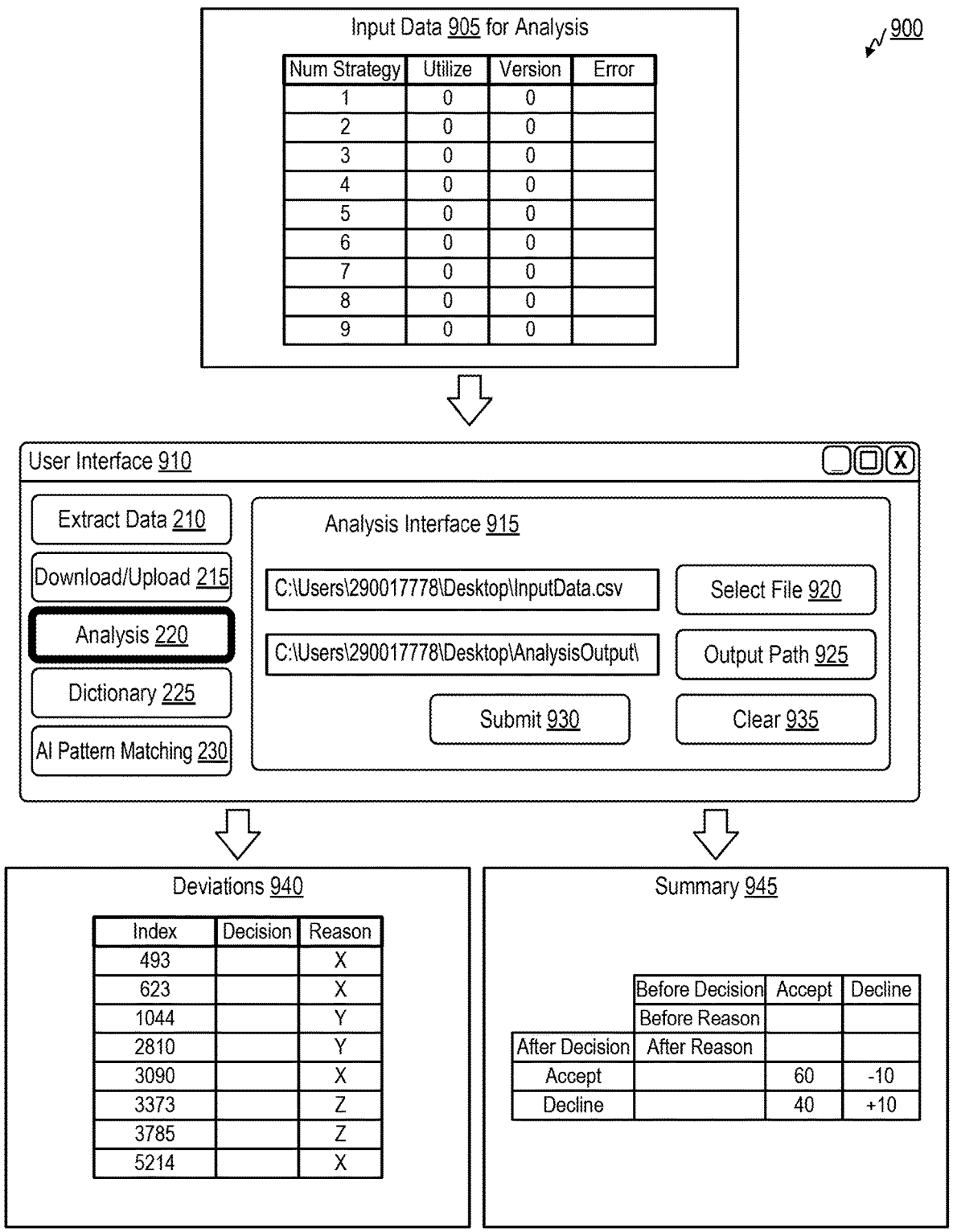
FIG. 9 is a conceptual diagram illustrating a user interface for a data analysis engine of a special-purpose analysis system along with examples of input data as well as outputs, including deviations and a summary, in accordance with some examples.

FIG. 9 is a conceptual diagram 900 illustrating a user interface 910 for a data analysis engine of a special-purpose analysis system 190 along with examples of input data 905 as well as outputs, including deviations 940 and a summary 945. In some examples, the input data 905 includes information output from a rule engine that performs a preliminary analysis over a data set according to a set of rules. The input data 905 can be input into the analysis interface 915 of the user interface 910 using the process for analysis 220. The analysis interface 915 includes a field and button for selecting a file 920 to analyze, which can refer to the input data 905 for analysis. The interface 915 includes a field and button for indicating an output path 925 where output data should be generated, output to, and stored in. The process for analysis 220 begins when a user interacts with a submit button 930. A clear button 935 can allow the user to clear out the fields and input new data to select the file 920 for input or the indicate the output path 925.

In the example illustrated in FIG. 9, the process for analysis 220 generates a first table indicating deviations 940 and a second table indicating a summary 945. The deviations 940 can indicate deviations between the input data 905 and previous data stored, parsed, organized, catalogued by, processed by, and/or analyzed by the special-purpose analysis system 190. The previous data can be a previous version of the input data 905, for instance. The input data 905 can include updates to the previous data. In some examples, the deviations 940 indicate every change or deviation between the previous data and the input data 905. In some examples, expected changes, discrepancies, or deviations between the previous data and the input data 905 are filtered out, so that the deviations 940 only show unexpected changes, discrepancies, or deviations between the previous data and the input data 905. This can save time by indicating to users which deviations are unexpected, allowing faster resolution of any issues that the devotions cause, or any issues that may have caused the deviations. In some examples, pattern recognition can be used to detect patterns in the deviations (e.g., in unexpected deviations) to help find and/or correct causes of deviations (e.g., issues in systems that can cause the deviations). The table for the deviations 940 indicates decisions and reasons as well as indices for the deviations. The reason column indicates, for instance, which variable of a number of variables in the input data includes the deviation (e.g., variables X, Y, or Z).

The summary 945 can provide a summarized view of post-analysis outcomes of the data, for instance indicating the respective volumes of different types of deviations (e.g., having different reasons, variables, types of changes to the system, etc.), total volume of deviations, changes in volumes of different types or categories of data caused by the deviations, and other statistics. For instance, the summary 945 can indicate that, under the prior data, 60% of users accepted applications, while 40% declined applications. Under the update to the prior data (in the input data 905), the summary 945 can indicate a 10% reduction in acceptance and a 10% increase in declines, which may be caused by users changing their minds, rules changing how user data is categorized and therefore who qualifies for a certain program in the first place, and/or errors that can cause such a deviation. In some examples, the summary 945 can further break down, by volume and/or proportion (e.g., percentage), how many of these changes were caused by users changing their minds, how many of these changes were caused by changes in rules, and how many of these changes were the result of errors. In some examples, the summary 945 uses a trained machine learning model, such as a large language model that preforms generative artificial intelligence, to generate a more targeted at least part of the summary 945 based on an analysis of the input data 905 and/or the deviations 940, saving analysts time by filtering out the specific date from 940.

Figure 10:
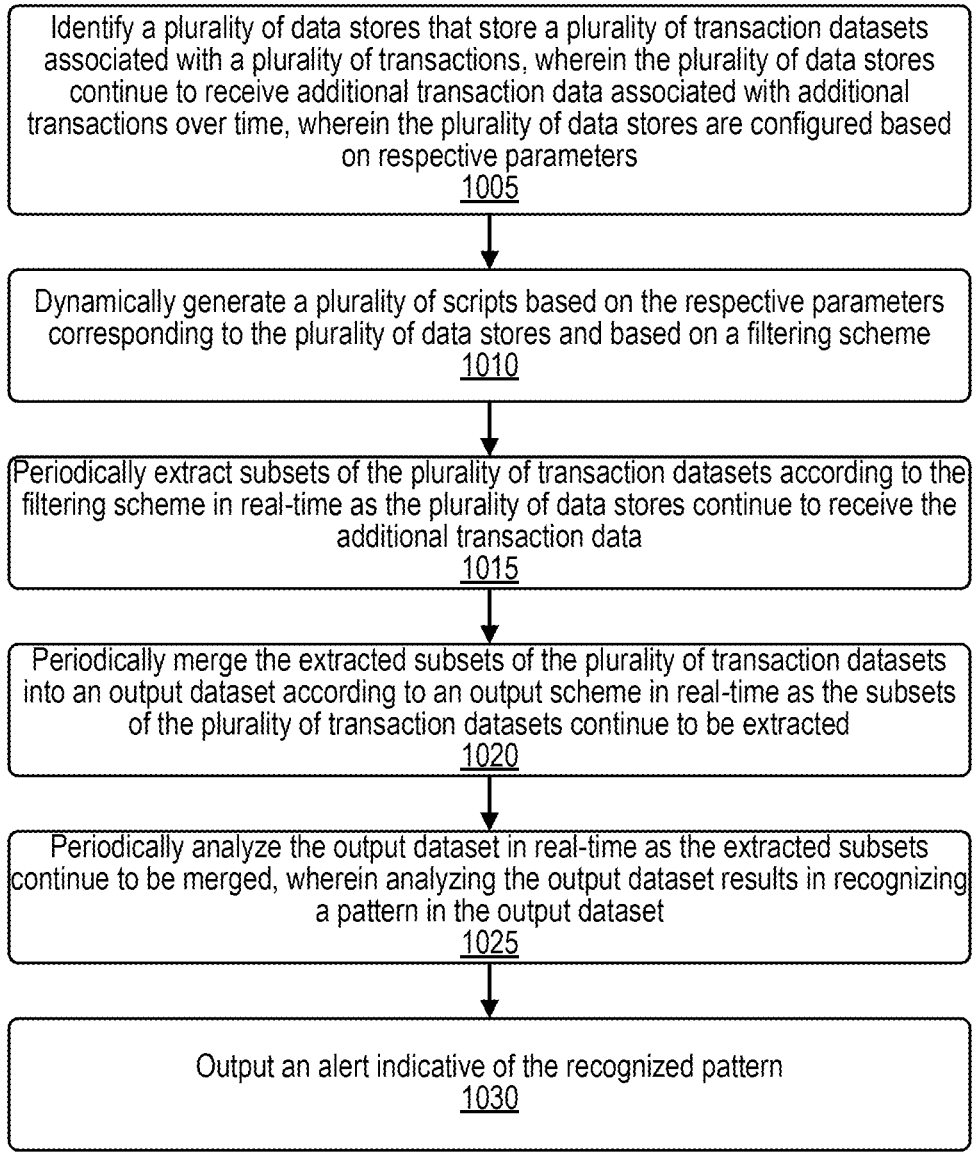
FIG. 10 is a flow diagram illustrating a dynamic data extraction and analysis process, in accordance with some examples.

FIG. 10 is a flow diagram illustrating a dynamic data extraction and analysis process 1000. The dynamic data extraction and analysis process 1000 may be performed by an analysis system. In some examples, the analysis system can include, for example, the special-purpose analysis system 190, the data lake 105, the data store 110, the data store 115, the data store 120, the extraction engine 125, the script generator 135, the processing engine 140, the analysis engine 150, the AI engine 155, the pattern recognition engine 160, the ML model(s) 165, the alert engine 175, the recipient device 180, the user interface 205, the user interface 305A, the user interface 305B, the user interface 405, the shell interface 410, the data architecture 415, the user device 420, the server(s) 425, the user interface 540, the user interface 545, the analysis system 600, the extraction engine 605, the decision engine 610, the validation and analysis engine 615, the recipient device 620, the ML engine 720, the ML model(s) 725, the analysis system of FIG. 8, the analysis system of FIG. 9, the user interface 910, the analysis interface 915, the computing system 1100, the processor 1110, or a combination thereof. In some examples, the analysis system includes one or more special-purpose computers and/or special-purpose computing systems.

At operation 1005, the analysis system is configured to, and can, identify a plurality of data stores that store a plurality of transaction datasets associated with a plurality of transactions. The plurality of data stores continue to receive additional transaction data associated with additional transactions over time. The plurality of data stores are configured based on respective parameters. Examples of the data stores include the data lake 105, the data store 110, the data store 115, and/or the data store 120. The parameters of a data store can be different based on the type of the data stores. For instance, the parameters of a data store can be different based on whether the data store is a relational database (e.g., a structured query language (SQL) database such as MySQL), a non-relational database (e.g., a NoSQL database), a data lake, a data warehouse, a data mart, statistical analysis software (SAS), a service that can output data (e.g., a software-as-a-service (SaaS)), a hashmap, a hashgraph, a directed acyclic graph (DAG), a table, a spreadsheet, a document store, a wide column store, a key-value store, a message queue, a heap, a tree, a list, an array, an arraylist, a matrix, a pivot table, a full-text search engine, a search engine, a dictionary, a distributed ledger (e.g., blockchain ledger or DAG ledger), a ledger, a MapReduce cluster, a distributed system, or a combination thereof.

In some examples, the respective parameters corresponding to the plurality of data stores include respective platforms that the plurality of data stores use. In some examples, the respective parameters corresponding to the plurality of data stores include respective data structure types that the plurality of data stores use.

In some examples, the analysis system is configured to, and can, identify a filtering scheme. Examples of the filtering scheme include the filtering scheme 130, the filtering scheme of the user interface 205, the first filtering scheme of the user interface 305A, the second filtering scheme of the user interface 305B, the filtering scheme of the user interface 540, the filtering scheme of the user interface 545, or a combination thereof.

At operation 1010, the analysis system is configured to, and can, dynamically generate a plurality of scripts based on the respective parameters corresponding to the plurality of data stores and based on the filtering scheme. Examples of script generation include script generation by the script generator 135 and/or by the shell interface 410 (e.g., operation 435). The scripts can include shell scripts, python scripts, visual basic (VBA) scripts, PySpark scripts, PROC SQL procedures, SAS functionality, SaaS requests, database queries, U-SQL scripts, T-SQL scripts, scripts and/or queries specific any of the types of data store listed above, or combinations thereof.

In some examples, the filtering scheme includes filtering based on a fraud check, wherein extracting the subsets of the plurality of transaction datasets according to the filtering scheme includes extracting the subsets of the plurality of transaction datasets that are to be used in performing the fraud check during the analysis of the output dataset.

At operation 1015, the analysis system is configured to, and can, periodically extract subsets of the plurality of transaction datasets according to the filtering scheme in real-time as the plurality of data stores continue to receive the additional transaction data. Examples of extraction of data include extraction by the extraction engine 125, extraction according to the user interface 205, extraction according to the user interface 305A, extraction according to the user interface 305B, extraction by the data architecture 415 (e.g. operation 440), extraction according to the user interface 540, extraction according to the user interface 545, extraction by the extraction engine 605, or a combination thereof.

In some examples, extracting subsets of the plurality of transaction datasets occurs periodically according to a schedule as the plurality of data stores receive the additional transaction data, and wherein the output dataset and the analysis are updated based on the additional transaction data.

In some examples, the analysis system is configured to, and can, identify an output scheme (e.g., the output scheme 145). In some examples, the analysis system is configured to, and can, periodically normalize the extracted subsets of the plurality of transaction datasets into an output dataset according to the output scheme in real-time as the subsets of the plurality of transaction datasets continue to be extracted. In some examples, the plurality of scripts are generated also based on the output scheme.

At operation 1020, the analysis system is configured to, and can, periodically merge the extracted subsets of the plurality of transaction datasets into an output dataset according to the output scheme in real-time as the subsets of the plurality of transaction datasets continue to be extracted. The output dataset 170 is an example of the output dataset of operating 1030. Examples of merging of the extracted subsets include processing of the datasets by the processing engine 140, normalizing and/or merging of data by the data architecture 415 (e.g., operation 445, operation 450, operation 455), merging by the extraction engine 605, or a combination thereof.

In some examples, merging the plurality of transaction datasets includes identifying one or more redundancies in the plurality of transaction datasets and removing the one or more redundancies from the plurality of transaction datasets At operation 1025, the analysis system is configured to, and can, periodically analyze the output dataset in real-time as the extracted subsets continue to be merged. Analyzing the output dataset results in recognizing a pattern in the output dataset. Examples of analysis of the extracted and merged data include analyses by the analysis engine 150, the AI engine 155, the pattern recognition engine 160, the ML model(s) 165, the alert engine 175, the analysis 220, the AI pattern matching 230, the shell interface 410 (e.g., operation 460), the data architecture 415 (e.g., operation 455), the decision engine 610, the validation and analysis engine 615, the ML engine 720, the ML model(s) 725 (e.g., the analysis 730 with the pattern 780), the data extraction 815, data processing 820, the further processing 835, the analysis interface 910, or a combination thereof.

In some examples, analyzing the output dataset includes providing at least a subset of the plurality of transaction datasets as an input to a trained machine learning model, and the trained machine learning model recognizes the pattern in the output dataset and outputs an indication of the pattern. Examples of the trained machine learning model include the ML model(s) 165 and/or the ML model(s) 725. In some examples, the trained machine learning model is trained using the AI engine 155 and/or the ML engine 720. In some examples, the trained machine learning model used as part of the pattern recognition engine 160. In some examples, the analysis system is configured to, and can, receive feedback on the pattern, and update the trained machine learning model using the feedback and the pattern as training data. Examples of updating the trained machine learning model using the feedback as additional training data include the further training 755 based on the feedback 750 and/or the validation 775, and/or the further training of the ML model(s) 165 based on feedback from the recipient device 180.

In some examples, analyzing the output dataset to recognize the pattern includes analyzing the output dataset to identify deviations in the additional transaction data relative to prior transaction data in the plurality of transaction datasets. In some examples, the analysis system is configured to, and can, identify respective reasons for the deviations (e.g., as in the deviations 940 and/or the summary 945). the analysis system is configured to, and can, identify whether a deviation of the deviations is expected (e.g., an expected deviation caused by an intentional change) or unexpected (e.g., an unexpected deviation caused by an error or miscategorization) (e.g., as in the deviations 940 and/or the summary 945).

In some examples, analyzing the output dataset to recognize the pattern includes inputting at least a portion of the output dataset into a machine learning model that is trained for pattern recognition.

At operation 1030, the analysis system is configured to, and can, output an alert indicative of the recognized pattern. In some examples, the analysis system is configured to, and can, generate the alert indicative of the recognized pattern before outputting the alert. Examples of generating and/or outputting the alert include generating and/or outputting the alert by the alert engine 175, the shell interface 410 (e.g., operation 470), the user interface 405 (e.g., operation 475). In some examples, the alert identifies the pattern within the output dataset.

In some examples, recognized pattern is indicative of a fraud attempt, and the alert identifies the fraud attempt. In some examples, the recognized pattern is indicative of a trend, and the alert identifies a prediction based on the trend.

In some examples, the recognized pattern is indicative of a disparity between data from different data stores regarding a transaction of the plurality of transactions, and the alert is indicative of the disparity. In some examples, the analysis system is configured to, and can, automatically correct the disparity.

In some examples, analyzing the output dataset includes recognizing the pattern in a subset of the output dataset, and the analysis system can output an indication of the subset of the output dataset.

Figure 11:
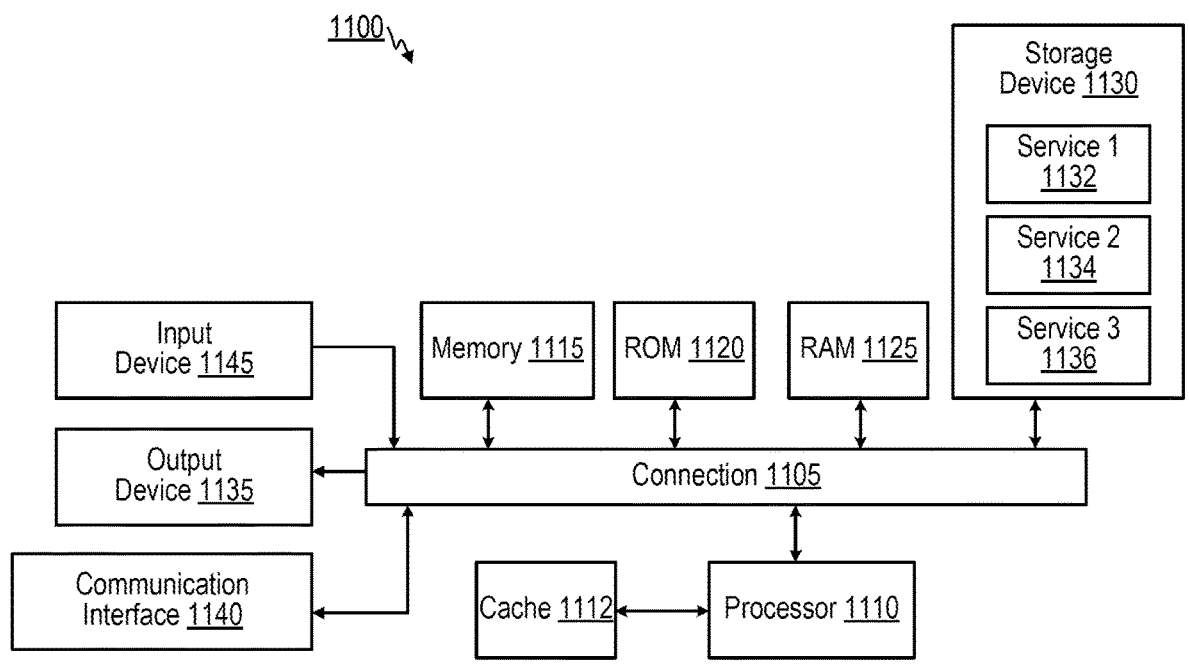
FIG. 11 is a block diagram illustrating an example of a computing system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1102.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method of dynamic extraction and analysis of data, the method comprising: identifying a plurality of data stores that store a plurality of transaction datasets associated with a plurality of transactions, wherein the plurality of data stores continue to receive additional transaction data associated with additional transactions over time, wherein the plurality of data stores are configured based on respective parameters; dynamically generating a plurality of scripts based on the respective parameters corresponding to the plurality of data stores and based on a filtering scheme; periodically extracting subsets of the plurality of transaction datasets according to the filtering scheme in real-time as the plurality of data stores continue to receive the additional transaction data; periodically merging the extracted subsets of the plurality of transaction datasets into an output dataset according to an output scheme in real-time as the subsets of the plurality of transaction datasets continue to be extracted; periodically analyzing the output dataset in real-time as the extracted subsets continue to be merged, wherein analyzing the output dataset results in recognizing a pattern in the output dataset; and outputting an alert indicative of the recognized pattern.

Aspect 2. The method of Aspect 1, wherein the respective parameters corresponding to the plurality of data stores include respective platforms that the plurality of data stores use.

Aspect 3. The method of any of Aspects 1 to 2, wherein the respective parameters corresponding to the plurality of data stores include respective data structure types that the plurality of data stores use.

Aspect 4. The method of any of Aspects 1 to 3, wherein the recognized pattern is indicative of a fraud attempt, and wherein the alert identifies the fraud attempt.

Aspect 5. The method of any of Aspects 1 to 4, wherein the recognized pattern is indicative of a trend, and wherein the alert identifies a prediction based on the trend.

Aspect 6. The method of any of Aspects 1 to 5, wherein the recognized pattern is indicative of a disparity between data from different data stores regarding a transaction of the plurality of transactions, wherein the alert is indicative of the disparity.

Aspect 7. The method of any of Aspects 1 to 6, further comprising: automatically correcting the disparity.

Aspect 8. The method of any of Aspects 1 to 7, further comprising: before merging the plurality of transaction datasets, normalizing the plurality of transaction datasets according to the output scheme.

Aspect 9. The method of any of Aspects 1 to 8, wherein the plurality of scripts are generated also based on the output scheme.

Aspect 10. The method of any of Aspects 1 to 9, wherein extracting subsets of the plurality of transaction datasets occurs periodically according to a schedule as the plurality of data stores receive the additional transaction data, and wherein the output dataset and the analysis are updated based on the additional transaction data.

Aspect 11. The method of any of Aspects 1 to 10, wherein merging the plurality of transaction datasets includes identifying one or more redundancies in the plurality of transaction datasets and removing the one or more redundancies from the plurality of transaction datasets.

Aspect 12. The method of any of Aspects 1 to 11, wherein the filtering scheme includes filtering based on a fraud check, wherein extracting the subsets of the plurality of transaction datasets according to the filtering scheme includes extracting the subsets of the plurality of transaction datasets that are to be used in performing the fraud check during the analysis of the output dataset.

Aspect 13. The method of any of Aspects 1 to 12, further comprising: outputting an indication of a subset of the output dataset, wherein analyzing the output dataset includes recognizing the pattern in the subset of the output dataset.

Aspect 14. The method of any of Aspects 1 to 13, wherein the alert identifies the pattern within the output dataset.

Aspect 15. The method of any of Aspects 1 to 14, wherein the respective parameters corresponding to the plurality of data stores indicate that at least one of the plurality of data stores is at least one of a data lake, a database, a data warehouse, a cloud-based software service, or a distributed computing system.

Aspect 16. The method of any of Aspects 1 to 15, wherein analyzing the output dataset to recognize the pattern includes inputting at least a portion of the output dataset into a machine learning model that is trained for pattern recognition.

Aspect 17. The method of any of Aspects 1 to 16, wherein analyzing the output dataset to recognize the pattern includes analyzing the output dataset to identify deviations in the additional transaction data relative to prior transaction data in the plurality of transaction datasets.

Aspect 18. The method of any of Aspects 1 to 17, further comprising: identifying respective reasons for the deviations.

Aspect 19. The method of any of Aspects 1 to 18, further comprising: identifying whether a deviation of the deviations is expected or unexpected.

Aspect 20. A system for dynamic extraction and analysis of data, the system comprising: a communication transceiver; a memory; and a processor coupled to the memory, the processor configured to: identify a plurality of data stores that store a plurality of transaction datasets associated with a plurality of transactions, wherein the plurality of data stores continue to receive additional transaction data associated with additional transactions over time, wherein the plurality of data stores are configured based on respective parameters; identify a filtering scheme; dynamically generate a plurality of scripts based on the respective parameters corresponding to the plurality of data stores and based on the filtering scheme; periodically extract subsets of the plurality of transaction datasets according to the filtering scheme in real-time as the plurality of data stores continue to receive the additional transaction data; identify an output scheme; periodically merge the extracted subsets of the plurality of transaction datasets into an output dataset according to the output scheme in real-time as the subsets of the plurality of transaction datasets continue to be extracted; periodically analyze the output dataset in real-time as the extracted subsets continue to be merged, wherein analyzing the output dataset results in recognizing a pattern in the output dataset; and output an alert indicative of the recognized pattern.

Aspect 21. The system of Aspect 20, wherein the respective parameters corresponding to the plurality of data stores include respective platforms that the plurality of data stores use.

Aspect 22. The system of any of Aspects 20 to 21, wherein the respective parameters corresponding to the plurality of data stores include respective data structure types that the plurality of data stores use.

Aspect 23. The system of any of Aspects 20 to 22, wherein the recognized pattern is indicative of a fraud attempt, and wherein the alert identifies the fraud attempt.

Aspect 24. The system of any of Aspects 20 to 23, wherein the recognized pattern is indicative of a trend, and wherein the alert identifies a prediction based on the trend.

Aspect 25. The system of any of Aspects 20 to 24, wherein the recognized pattern is indicative of a disparity between data from different data stores regarding a transaction of the plurality of transactions, wherein the alert is indicative of the disparity.

Aspect 26. The system of any of Aspects 20 to 25, the processor configured to: automatically correct the disparity.

Aspect 27. The system of any of Aspects 20 to 26, the processor configured to: before merging the plurality of transaction datasets, normalize the plurality of transaction datasets according to the output scheme.

Aspect 28. The system of any of Aspects 20 to 27, wherein the plurality of scripts are generated also based on the output scheme.

Aspect 29. The system of any of Aspects 20 to 28, wherein extracting subsets of the plurality of transaction datasets occurs periodically according to a schedule as the plurality of data stores receive the additional transaction data, and wherein the output dataset and the analysis are updated based on the additional transaction data.

Aspect 30. The system of any of Aspects 20 to 29, wherein merging the plurality of transaction datasets includes identifying one or more redundancies in the plurality of transaction datasets and removing the one or more redundancies from the plurality of transaction datasets.

Aspect 31. The system of any of Aspects 20 to 30, wherein the filtering scheme includes filtering based on a fraud check, wherein extracting the subsets of the plurality of transaction datasets according to the filtering scheme includes extracting the subsets of the plurality of transaction datasets that are to be used in performing the fraud check during the analysis of the output dataset.

Aspect 32. The system of any of Aspects 20 to 31, the processor configured to: output an indication of a subset of the output dataset, wherein analyzing the output dataset includes recognizing the pattern in the subset of the output dataset.

Aspect 33. The system of any of Aspects 20 to 32, wherein the alert identifies the pattern within the output dataset.

Aspect 34. The system of any of Aspects 20 to 33, wherein the respective parameters corresponding to the plurality of data stores indicate that at least one of the plurality of data stores is at least one of a data lake, a database, a data warehouse, a cloud-based software service, or a distributed computing system.

Aspect 35. The system of any of Aspects 20 to 34, wherein analyzing the output dataset to recognize the pattern includes inputting at least a portion of the output dataset into a machine learning model that is trained for pattern recognition.

Aspect 36. The system of any of Aspects 20 to 35, wherein analyzing the output dataset to recognize the pattern includes analyzing the output dataset to identify deviations in the additional transaction data relative to prior transaction data in the plurality of transaction datasets.

Aspect 37. The system of any of Aspects 20 to 36, the processor configured to: identifying respective reasons for the deviations.

Aspect 38. The system of any of Aspects 20 to 37, the processor configured to: identify whether a deviation of the deviations is expected or unexpected.

Aspect 39. A non-transitory computer readable storage medium having embodied thereon a program, wherein the program is executable by a processor to perform a method of dynamic extraction and analysis of data, the method comprising: identifying a plurality of data stores that store a plurality of transaction datasets associated with a plurality of transactions, wherein the plurality of data stores continue to receive additional transaction data associated with additional transactions over time, wherein the plurality of data stores are configured based on respective parameters; identifying a filtering scheme; dynamically generating a plurality of scripts based on the respective parameters corresponding to the plurality of data stores and based on the filtering scheme; periodically extracting subsets of the plurality of transaction datasets according to the filtering scheme in real-time as the plurality of data stores continue to receive the additional transaction data; identifying an output scheme; periodically merging the extracted subsets of the plurality of transaction datasets into an output dataset according to the output scheme in real-time as the subsets of the plurality of transaction datasets continue to be extracted; periodically analyzing the output dataset in real-time as the extracted subsets continue to be merged, wherein analyzing the output dataset results in recognizing a pattern in the output dataset; and outputting an alert indicative of the recognized pattern.

Aspect 40. The non-transitory computer readable storage medium of Aspect 39, wherein the respective parameters corresponding to the plurality of data stores include respective platforms that the plurality of data stores use.

Aspect 41. The non-transitory computer readable storage medium of any of Aspects 39 to 40, wherein the respective parameters corresponding to the plurality of data stores include respective data structure types that the plurality of data stores use.

Aspect 42. The non-transitory computer readable storage medium of any of Aspects 39 to 41, wherein the recognized pattern is indicative of a fraud attempt, and wherein the alert identifies the fraud attempt.

Aspect 43. The non-transitory computer readable storage medium of any of Aspects 39 to 42, wherein the recognized pattern is indicative of a trend, and wherein the alert identifies a prediction based on the trend.

Aspect 44. The non-transitory computer readable storage medium of any of Aspects 39 to 43, wherein the recognized pattern is indicative of a disparity between data from different data stores regarding a transaction of the plurality of transactions, wherein the alert is indicative of the disparity.

Aspect 45. The non-transitory computer readable storage medium of any of Aspects 39 to 44, the method further comprising: automatically correcting the disparity.

Aspect 46. The non-transitory computer readable storage medium of any of Aspects 39 to 45, the method further comprising: before merging the plurality of transaction datasets, normalizing the plurality of transaction datasets according to the output scheme.

Aspect 47. The non-transitory computer readable storage medium of any of Aspects 39 to 46, wherein the plurality of scripts are generated also based on the output scheme.

Aspect 48. The non-transitory computer readable storage medium of any of Aspects 39 to 47, wherein extracting subsets of the plurality of transaction datasets occurs periodically according to a schedule as the plurality of data stores receive the additional transaction data, and wherein the output dataset and the analysis are updated based on the additional transaction data.

Aspect 49. The non-transitory computer readable storage medium of any of Aspects 39 to 48, wherein merging the plurality of transaction datasets includes identifying one or more redundancies in the plurality of transaction datasets and removing the one or more redundancies from the plurality of transaction datasets.

Aspect 50. The non-transitory computer readable storage medium of any of Aspects 39 to 49, wherein the filtering scheme includes filtering based on a fraud check, wherein extracting the subsets of the plurality of transaction datasets according to the filtering scheme includes extracting the subsets of the plurality of transaction datasets that are to be used in performing the fraud check during the analysis of the output dataset.

Aspect 51. The non-transitory computer readable storage medium of any of Aspects 39 to 50, the method further comprising: outputting an indication of a subset of the output dataset, wherein analyzing the output dataset includes recognizing the pattern in the subset of the output dataset.

Aspect 52. The non-transitory computer readable storage medium of any of Aspects 39 to 51, wherein the alert identifies the pattern within the output dataset.

Aspect 53. The non-transitory computer readable storage medium of any of Aspects 39 to 52, wherein the respective parameters corresponding to the plurality of data stores indicate that at least one of the plurality of data stores is at least one of a data lake, a database, a data warehouse, a cloud-based software service, or a distributed computing system.

Aspect 54. The non-transitory computer readable storage medium of any of Aspects 39 to 53, wherein analyzing the output dataset to recognize the pattern includes inputting at least a portion of the output dataset into a machine learning model that is trained for pattern recognition.

Aspect 55. The non-transitory computer readable storage medium of any of Aspects 39 to 54, wherein analyzing the output dataset to recognize the pattern includes analyzing the output dataset to identify deviations in the additional transaction data relative to prior transaction data in the plurality of transaction datasets.

Aspect 56. The non-transitory computer readable storage medium of any of Aspects 39 to 55, the method further comprising: identifying respective reasons for the deviations.

Aspect 57. The non-transitory computer readable storage medium of any of Aspects 39 to 56, the method further comprising: identifying whether a deviation of the deviations is expected or unexpected.

Aspect 58: An apparatus for dynamic timed decisioning, the apparatus comprising means for performing operations according to any of Aspects 1 to 57.

The invention claimed is:
1. A method of dynamic extraction and analysis of data, the method comprising:
receiving identification of a plurality of data stores that store a plurality of transaction datasets associated with a plurality of transactions, wherein the identification is received through a user interface, wherein the plurality of data stores continue to receive additional transaction data associated with additional transactions over time, and wherein the plurality of data stores are configured based on respective parameters;
dynamically generating a plurality of scripts based on the respective parameters corresponding to the plurality of data stores and based on a filtering scheme;
periodically extracting subsets of the plurality of transaction datasets according to the filtering scheme in real-time as the plurality of data stores continue to receive the additional transaction data;
periodically merging the extracted subsets of the plurality of transaction datasets into an output dataset according to an output scheme in real-time as the subsets of the plurality of transaction datasets continue to be extracted;

periodically analyzing the output dataset in real-time as the extracted subsets continue to be merged, wherein analyzing the output dataset results in recognizing a pattern in the output dataset; and
outputting an alert indicative of the recognized pattern.

2. The method of claim 1, wherein the respective parameters corresponding to the plurality of data stores include respective platforms that the plurality of data stores use.

3. The method of claim 1, wherein the respective parameters corresponding to the plurality of data stores include respective data structure types that the plurality of data stores use.

4. The method of claim 1, wherein the recognized pattern is indicative of a fraud attempt, and wherein the alert identifies the fraud attempt.

5. The method of claim 1, wherein the recognized pattern is indicative of a trend, and wherein the alert identifies a prediction based on the trend.

6. The method of claim 1, wherein the recognized pattern is indicative of a disparity between data from different data stores regarding a transaction of the plurality of transactions, wherein the alert is indicative of the disparity.

7. The method of claim 6, further comprising:
automatically correcting the disparity.

8. The method of claim 1, further comprising:
before merging the plurality of transaction datasets, normalizing the plurality of transaction datasets according to the output scheme.

9. The method of claim 1, wherein the plurality of scripts are generated also based on the output scheme.

10. The method of claim 1, wherein extracting subsets of the plurality of transaction datasets occurs periodically according to a schedule as the plurality of data stores receive the additional transaction data, and wherein the output dataset and the analysis are updated based on the additional transaction data.

11. The method of claim 1, wherein merging the plurality of transaction datasets includes identifying one or more redundancies in the plurality of transaction datasets and removing the one or more redundancies from the plurality of transaction datasets.

12. The method of claim 1, wherein the filtering scheme includes filtering based on a fraud check, wherein extracting the subsets of the plurality of transaction datasets according to the filtering scheme includes extracting the subsets of the plurality of transaction datasets that are to be used in performing the fraud check during the analysis of the output dataset.

13. The method of claim 1, further comprising:
outputting an indication of a subset of the output dataset, wherein analyzing the output dataset includes recognizing the pattern in the subset of the output dataset.

14. The method of claim 1, wherein the alert identifies the pattern within the output dataset.

15. The method of claim 1, wherein the respective parameters corresponding to the plurality of data stores indicate that at least one of the plurality of data stores is at least one of a data lake, a database, a data warehouse, a cloud-based software service, or a distributed computing system.

16. The method of claim 1, wherein analyzing the output dataset to recognize the pattern includes inputting at least a portion of the output dataset into a machine learning model that is trained for pattern recognition.

17. The method of claim 1, wherein analyzing the output dataset to recognize the pattern includes analyzing the output dataset to identify deviations in the additional transaction data relative to prior transaction data in the plurality of transaction datasets.

18. The method of claim 17, further comprising:
identifying respective reasons for the deviations.

19. The method of claim 17, further comprising:
identifying whether a deviation of the deviations is expected or unexpected.

20. A system for dynamic extraction and analysis of data, the system comprising:
a communication transceiver;
a memory; and
a processor coupled to the memory, the processor configured to:
receive identification of a plurality of data stores that store a plurality of transaction datasets associated with a plurality of transactions, wherein the identification is received through a user interface, wherein the plurality of data stores continue to receive additional transaction data associated with additional transactions over time, wherein the plurality of data stores are configured based on respective parameters;
identify a filtering scheme;
dynamically generate a plurality of scripts based on the respective parameters corresponding to the plurality of data stores and based on the filtering scheme;
periodically extract subsets of the plurality of transaction datasets according to the filtering scheme in real-time as the plurality of data stores continue to receive the additional transaction data;
identify an output scheme;
periodically merge the extracted subsets of the plurality of transaction datasets into an output dataset according to the output scheme in real-time as the subsets of the plurality of transaction datasets continue to be extracted;
periodically analyze the output dataset in real-time as the extracted subsets continue to be merged, wherein analyzing the output dataset results in recognizing a pattern in the output dataset; and
output an alert indicative of the recognized pattern.

21. The system of claim 20, wherein the respective parameters corresponding to the plurality of data stores include respective platforms that the plurality of data stores use.

22. The system of claim 21, wherein the respective parameters corresponding to the plurality of data stores include respective data structure types that the plurality of data stores use.

23. The system of claim 20, wherein the recognized pattern is indicative of a fraud attempt, and wherein the alert identifies the fraud attempt.

24. The system of claim 20, wherein the recognized pattern is indicative of a trend, and wherein the alert identifies a prediction based on the trend.

25. The system of claim 20, wherein the recognized pattern is indicative of a disparity between data from different data stores regarding a transaction of the plurality of transactions, wherein the alert is indicative of the disparity.

26. The system of claim 25, the processor configured to:
automatically correct the disparity.

27. The system of claim 20, the processor configured to:
before merging the plurality of transaction datasets, normalize the plurality of transaction datasets according to the output scheme.

28. The system of claim 20, wherein the plurality of scripts are generated also based on the output scheme.

29. The system of claim 20, wherein extracting subsets of the plurality of transaction datasets occurs periodically according to a schedule as the plurality of data stores receive the additional transaction data, and wherein the output dataset and the analysis are updated based on the additional transaction data.

30. The system of claim 20, wherein merging the plurality of transaction datasets includes identifying one or more redundancies in the plurality of transaction datasets and removing the one or more redundancies from the plurality of transaction datasets.

31. The system of claim 20, wherein the filtering scheme includes filtering based on a fraud check, wherein extracting the subsets of the plurality of transaction datasets according to the filtering scheme includes extracting the subsets of the plurality of transaction datasets that are to be used in performing the fraud check during the analysis of the output dataset.

32. The system of claim 20, the processor configured to:
output an indication of a subset of the output dataset, wherein analyzing the output dataset includes recognizing the pattern in the subset of the output dataset.

33. The system of claim 20, wherein the alert identifies the pattern within the output dataset.

34. The system of claim 20, wherein the respective parameters corresponding to the plurality of data stores indicate that at least one of the plurality of data stores is at least one of a data lake, a database, a data warehouse, a cloud-based software service, or a distributed computing system.

35. The system of claim 20, wherein analyzing the output dataset to recognize the pattern includes inputting at least a portion of the output dataset into a machine learning model that is trained for pattern recognition.

36. The system of claim 20, wherein analyzing the output dataset to recognize the pattern includes analyzing the output dataset to identify deviations in the additional transaction data relative to prior transaction data in the plurality of transaction datasets.

37. The system of claim 36, the processor configured to:
identify respective reasons for the deviations.

38. The system of claim 36, further comprising:
identify whether a deviation of the deviations is expected or unexpected.

39. A non-transitory computer readable storage medium having embodied thereon a program, wherein the program is executable by a processor to perform a method of dynamic extraction and analysis of data, the method comprising:
receiving identification of a plurality of data stores that store a plurality of transaction datasets associated with a plurality of transactions, wherein the identification is received through a user interface, wherein the plurality of data stores continue to receive additional transaction data associated with additional transactions over time, wherein the plurality of data stores are configured based on respective parameters;
identifying a filtering scheme;
dynamically generating a plurality of scripts based on the respective parameters corresponding to the plurality of data stores and based on the filtering scheme;
periodically extracting subsets of the plurality of transaction datasets according to the filtering scheme in real-time as the plurality of data stores continue to receive the additional transaction data;
identifying an output scheme;
periodically merging the extracted subsets of the plurality of transaction datasets into an output dataset according to the output scheme in real-time as the subsets of the plurality of transaction datasets continue to be extracted;
periodically analyzing the output dataset in real-time as the extracted subsets continue to be merged, wherein analyzing the output dataset results in recognizing a pattern in the output dataset; and
outputting an alert indicative of the recognized pattern.

40. The non-transitory computer readable storage medium of claim 39, wherein the respective parameters corresponding to the plurality of data stores include respective platforms that the plurality of data stores use.

41. The non-transitory computer readable storage medium of claim 39, wherein the respective parameters corresponding to the plurality of data stores include respective data structure types that the plurality of data stores use.

42. The non-transitory computer readable storage medium of claim 39, wherein the recognized pattern is indicative of a fraud attempt, and wherein the alert identifies the fraud attempt.

43. The non-transitory computer readable storage medium of claim 39, wherein the recognized pattern is indicative of a trend, and wherein the alert identifies a prediction based on the trend.

44. The non-transitory computer readable storage medium of claim 39, wherein the recognized pattern is indicative of a disparity between data from different data stores regarding a transaction of the plurality of transactions, wherein the alert is indicative of the disparity.

45. The non-transitory computer readable storage medium of claim 44, the method further comprising:
automatically correcting the disparity.

46. The non-transitory computer readable storage medium of claim 39, the method further comprising:
before merging the plurality of transaction datasets, normalizing the plurality of transaction datasets according to the output scheme.

47. The non-transitory computer readable storage medium of claim 39, wherein the plurality of scripts are generated also based on the output scheme.

48. The non-transitory computer readable storage medium of claim 39, wherein extracting subsets of the plurality of transaction datasets occurs periodically according to a schedule as the plurality of data stores receive the additional transaction data, and wherein the output dataset and the analysis are updated based on the additional transaction data.

49. The non-transitory computer readable storage medium of claim 39, wherein merging the plurality of transaction datasets includes identifying one or more redundancies in the plurality of transaction datasets and removing the one or more redundancies from the plurality of transaction datasets.

50. The non-transitory computer readable storage medium of claim 39, wherein the filtering scheme includes filtering based on a fraud check, wherein extracting the subsets of the plurality of transaction datasets according to the filtering scheme includes extracting the subsets of the plurality of transaction datasets that are to be used in performing the fraud check during the analysis of the output dataset.

51. The non-transitory computer readable storage medium of claim 39, the method further comprising:
outputting an indication of a subset of the output dataset, wherein analyzing the output dataset includes recognizing the pattern in the subset of the output dataset.

52. The non-transitory computer readable storage medium of claim 39, wherein the alert identifies the pattern within the output dataset.

53. The non-transitory computer readable storage medium of claim 39, wherein the respective parameters corresponding to the plurality of data stores indicate that at least one of the plurality of data stores is at least one of a data lake, a database, a data warehouse, a cloud-based software service, or a distributed computing system.

54. The non-transitory computer readable storage medium of claim 39, wherein analyzing the output dataset to recognize the pattern includes inputting at least a portion of the output dataset into a machine learning model that is trained for pattern recognition.

55. The non-transitory computer readable storage medium of claim 39, wherein analyzing the output dataset to recognize the pattern includes analyzing the output dataset to identify deviations in the additional transaction data relative to prior transaction data in the plurality of transaction datasets.

56. The non-transitory computer readable storage medium of claim 55, the method further comprising:
   identifying respective reasons for the deviations.

57. The non-transitory computer readable storage medium of claim 55, the method further comprising:
   identifying whether a deviation of the deviations is expected or unexpected.

* * * * *

UNITED STATES PATENT AND TRADEMARK OFFICE
CERTIFICATE OF CORRECTION

| | | |
|---|---|---|
| PATENT NO. | : 11,922,516 B2 | Page 1 of 1 |
| APPLICATION NO. | : 18/315751 | |
| DATED | : March 5, 2024 | |
| INVENTOR(S) | : Piyush Sarda et al. | |

It is certified that error appears in the above-identified patent and that said Letters Patent is hereby corrected as shown below:

On the Title Page

Column 1, Line 10-11, Item (72) Inventors:
Change "Adbul Abdulrahman" to "Abdul Abdulrahman".

Signed and Sealed this
Thirtieth Day of September, 2025

John A. Squires
*Director of the United States Patent and Trademark Office*